US009422902B2

(12) United States Patent
Kare et al.

(10) Patent No.: US 9,422,902 B2
(45) Date of Patent: Aug. 23, 2016

(54) HEAT TRANSFER SYSTEMS FOR INTERNAL COMBUSTION ENGINES AND METHODS

(71) Applicant: Elwha LLC, Bellevue, WA (US)

(72) Inventors: Jordin T. Kare, Seattle, WA (US); Lowell L. Wood, Jr., Bellevue, WA (US)

(73) Assignee: ELWHA LLC, Bellevue, WA (US)

( * ) Notice: Subject to any disclaimer, the term of this patent is extended or adjusted under 35 U.S.C. 154(b) by 107 days.

(21) Appl. No.: 14/459,843

(22) Filed: Aug. 14, 2014

(65) Prior Publication Data

US 2016/0047344 A1 Feb. 18, 2016

(51) Int. Cl.

| | |
|---|---|
| ***B60H 1/03*** | (2006.01) |
| ***F02M 53/02*** | (2006.01) |
| ***F02M 53/04*** | (2006.01) |
| ***F02M 53/06*** | (2006.01) |
| ***F02B 55/10*** | (2006.01) |
| *F02B 3/06* | (2006.01) |
| *F02N 19/10* | (2010.01) |
| *F01P 11/20* | (2006.01) |
| *F01P 3/00* | (2006.01) |

(52) U.S. Cl.

CPC ................ *F02M 53/02* (2013.01); *F02B 55/10* (2013.01); *F02M 53/04* (2013.01); *F02M 53/043* (2013.01); *F02M 53/06* (2013.01); *F01P 11/20* (2013.01); *F01P 2003/005* (2013.01); *F01P 2060/18* (2013.01); *F02B 3/06* (2013.01); *F02N 19/10* (2013.01)

(58) Field of Classification Search

CPC ........... F02N 19/10; F02N 19/02; F02B 3/06; F01P 11/20; F01P 2060/18

USPC .................................................. 123/142.5 R

See application file for complete search history.

(56) References Cited

U.S. PATENT DOCUMENTS

| | | | | |
|---|---|---|---|---|
| 2,173,081 A * | 9/1939 | Barkeij | ..................... | F02B 9/00 123/275 |
| 2,296,790 A | 6/1942 | Jones | | |
| 3,431,094 A * | 3/1969 | Leas | ...................... | C10G 25/00 252/389.1 |
| 4,541,367 A | 9/1985 | Lindberg | | |
| 4,790,284 A | 12/1988 | Ferrenberg et al. | | |
| 2005/0039711 A1 | 2/2005 | Bryant | | |
| 2007/0119392 A1 | 5/2007 | Leone et al. | | |
| 2012/0037337 A1 | 2/2012 | Zillmer | | |

OTHER PUBLICATIONS

Zhao et al., Automotive Spark-Ignited Direct-Injection Gasoline Engines, Progress in Energy and Combustion Science 25, 1999, pp. 437-562, Elsevier Science Ltd.

Watson, The Development of an Engine With a Higher Compression Ratio, Master's thesis, California Institute of Technology, Jan. 1, 1928, http://resolver.caltech.edu/CaltechETD:etd-02282005-104223.

* cited by examiner

*Primary Examiner* — Lindsay Low
*Assistant Examiner* — Charles Brauch

(57) ABSTRACT

A heat transfer system for use in an internal combustion engine and related methods are disclosed. The heat transfer system may be configured to absorb and transfer heat from a combustion chamber of an internal combustion engine. The heat transfer system may also be configured to reintroduce absorbed and/or transferred heat into the internal combustion engine via a fuel injector or another suitable device. Removal of the heat from the combustion chamber may reduce a quantity of work required or used for compression of a first combustion fluid, increase a charge density in the combustion chamber, and/or increase the compression ratio of the engine. Additionally, the heat transfer system may be designed such that it may be used to retrofit an existing internal combustion engine.

28 Claims, 21 Drawing Sheets

HEAT TRANSFER SYSTEMS FOR INTERNAL COMBUSTION ENGINES AND METHODS

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)). In addition, the present application is related to the "Related Applications," if any, listed below.

Priority Applications

None

If the listings of applications provided above are inconsistent with the listings provided via an ADS, it is the intent of the Applicant to claim priority to each application that appears in the priority applications section of the ADS and to each application that appears in the Priority Applications section of this application.

All subject matter of the Priority Applications and the Related Applications and of any and all parent, grandparent, great-grandparent, etc. Applications of the Priority Applications and the Related Applications, including any priority claims, is incorporated herein by reference to the extent such subject matter is not inconsistent herewith.

TECHNICAL FIELD

The present disclosure relates generally to heat transfer systems configured to absorb and/or transfer heat from a combustion chamber of an internal combustion engine. The heat transfer systems may also be configured to reintroduce previously absorbed and/or transferred heat into the internal combustion engine via a fuel injector or another device. Heat transfer systems of the present disclosure may also be configured for retrofitting existing internal combustion engines.

BRIEF DESCRIPTION OF THE DRAWINGS

The embodiments disclosed herein will become more fully apparent from the following description and appended claims, taken in conjunction with the accompanying drawings. These drawings depict only typical embodiments, which will be described with additional specificity and detail through use of the accompanying drawings in which:

DETAILED DESCRIPTION

Figure 1:
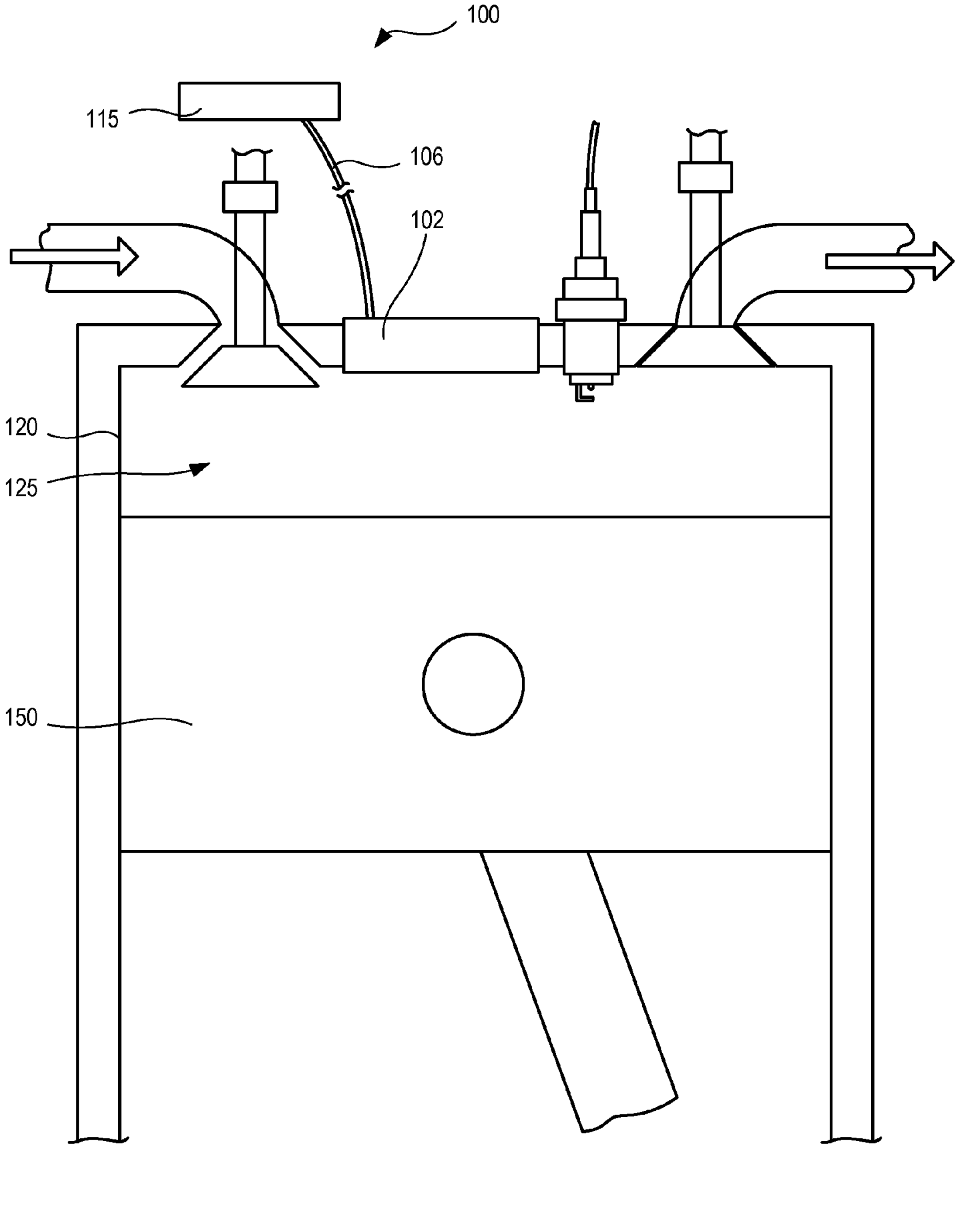
FIG. 1 is a schematic illustration of a portion of an embodiment of a spark-ignition internal combustion engine comprising an embodiment of a heat transfer system.

An internal combustion engine may comprise a heat transfer system disposed in thermal communication with a combustion chamber of the engine. The heat transfer system may be configured to absorb heat from the combustion chamber during a compression of a first combustion fluid. The heat transfer system may be further configured to transfer the absorbed heat to a first cooling fluid. Removal of the heat from the combustion chamber may reduce a quantity of energy or work required or used for compression and may enable increasing the charge density in the combustion chamber or increasing the compression ratio of the engine. Further, in some embodiments, the transferred heat may be reintroduced into the combustion chamber during a predetermined time period (i.e., without limitation, during at least a portion of a power stroke) such that at least a portion of the absorbed and/or transferred thermal energy is not discarded, lost, or wasted. In some other embodiments, the transferred heat may be used for another purpose (e.g., run through a thermoelectric power generator). In some additional embodiments, the heat transfer system may be designed such that it may be used to retrofit an existing internal combustion engine.

As used herein, the term "internal combustion engine" generally refers to an engine wherein combustion of a first combustion fluid, such as a fuel, occurs in a variable-volume combustion chamber that is an integral part of the engine's fluid flow circuit. There are many types of internal combustion engines, including, but not limited to, both reciprocating and rotary configurations. Common types of internal combustion engines include, but are not limited to, two-stroke engines, four-stroke engines, six-stroke engines, diesel engines, Atkinson cycle engines, Miller cycle engines, and Wankel engines. Any of the components, devices, and/or systems described herein may be configured to operate in any type of internal combustion engine.

It will be readily understood that the components of the embodiments as generally described and illustrated in the Figures herein could be arranged and designed in a wide variety of different configurations. Thus, the following more detailed description of various embodiments, as represented in the Figures, is not intended to limit the scope of the disclosure, but is merely representative of various embodiments. While the various aspects of the embodiments are presented in drawings, the drawings are not necessarily drawn to scale unless specifically indicated.

The phrases "connected to," "coupled to," and "in communication with" refer to any form of interaction between two or more entities, including mechanical, electrical, magnetic, electromagnetic, fluid, and thermal interaction. Two components may be coupled to each other even though they are not in direct contact with each other. For example, two components may be coupled to each other through an intermediate component.

The term "fluid" is used in its broadest sense to refer to any fluid, including both liquids and gasses as well as solutions, compounds, suspensions, etc., which generally behave as a fluid.

FIG. 1 is a schematic illustration of a portion of an embodiment of a spark-ignition internal combustion engine comprising an embodiment of a heat transfer system 100. All the figures herein are schematic in nature. In other words, the figures show the functional and operational relationships of components of the system, but are not intended to indicate any particular structure or spatial disposition of any component or any group of components in the system. Additionally, the schematic views herein may be drawn to show internal working components of the engine without explicitly designating cross sections or cutaways of other components. For example, a cylinder may be schematically shown with a piston disposed therein without indicating a cross sectional portion or cutaway of the cylinder wall.

In the embodiment of FIG. 1, a portion of an embodiment of a combustion chamber 120 defining an interior volume 125 is depicted. The illustrated embodiment of a spark-ignition internal combustion engine can comprise the combustion chamber 120 and a heat absorption element 102. As shown, the heat absorption element 102 is in communication, or thermal communication, with the interior volume 125 of the combustion chamber 120. For example, the heat absorption element 102 may be fixedly positioned in the interior volume 125 of the combustion chamber 120. In another example, the heat absorption element 102 may be configured to extend into the interior volume 125 of the combustion chamber 120 from a top portion, or head, of the combustion chamber 120. Alternatively, the heat absorption element 102 may be configured to extend into the interior volume 125 of the combustion chamber 120 from a side portion of the combustion chamber 120 or the heat absorption element 102 may be configured to extend into the interior volume 125 of the combustion chamber 120 from a face of a piston 150 disposed within the interior volume 125 of the combustion chamber 120. In some embodiments, the heat absorption element 102 may be configured to absorb at least a portion of an amount of heat generated by work done on a first combustion fluid disposed in the interior volume 125 of the combustion chamber 120. The first combustion fluid may comprise air, an air-fuel mixture, oxygen, a recycled exhaust gas, an inert gas, and/or any other suitable fluid. The work done on the first combustion fluid may be compression of the first combustion fluid. For example, compression of a volume of the first combustion fluid in the interior volume 125 of the combustion chamber 120 may be effected or performed by movement of the piston 150. In some embodiments, the transfer of heat absorbed by the heat absorption element 102 from the combustion chamber 120 to a position outside of the combustion chamber 120 may reduce, or be configured to reduce, the amount of work required or used to compress the volume of the first combustion fluid. Suppressing a peak temperature of the compressed first combustion fluid by heat transfer out of the interior volume 125 of the combustion chamber 120 may permit the use of higher compression ratios in some embodiments of internal combustion engines, and thus may enable higher internal combustion engine operating efficiencies.

The heat absorption element 102 may also be configured to transfer at least a portion of the absorbed heat to a first cooling fluid. The first cooling fluid may comprise a coolant, an engine coolant, a fuel, air, another suitable fluid, or any combination thereof. The heat absorption element 102 may be configured to comprise time-varying heat absorption properties. For example, the heat absorption element 102 may be configured such that the first cooling fluid flows at least substantially continuously through the heat absorption element 102 or through at least a portion of the heat absorption element 102. Alternatively, the heat absorption element 102 may be configured such that the first cooling fluid flows at least substantially intermittently through the heat absorption element 102 or through at least a portion of the heat absorption element 102. The first cooling fluid may flow, or be configured to flow, at least substantially intermittently through the heat absorption element 102 such that heat is absorbed from the combustion chamber 120 at one or more predetermined time periods when it may be advantageous, or more advantageous, to absorb heat from the combustion chamber 120 relative to other time periods. In some embodiments, at least a portion of the first cooling fluid may egress, or be configured to egress, from the heat absorption element 102, or from at least a portion of the heat absorption element 102, during at least a portion of a power stroke. In some other embodiments, a majority of the first cooling fluid may egress, or be configured to egress, from the heat absorption element 102, or from at least a portion of the heat absorption element 102, during at least a portion of the power stroke. Egress of the first cooling fluid from the heat absorption element 102 may also occur during other time periods.

In various embodiments, the heat absorption element 102 may be configured to transfer at least a portion of the absorbed heat to a heat sink 115. As used herein, a heat sink is a device or material configured to absorb heat from a heat source without substantially increasing in temperature. At least a portion of the absorbed heat, or a majority of the absorbed heat, may be transferred to the heat sink 115 via the first cooling fluid, wherein the first cooling fluid may be disposed in a thermal transfer element 106 configured to couple each of the heat absorption element 102 and the heat sink 115. The heat sink 115 may comprise a second cooling fluid, a fuel, air, a solid, another suitable substance, or any combination thereof. The second cooling fluid may comprise a coolant, an engine coolant, a fuel, air, another suitable fluid, or any combination thereof. In some embodiments, the second cooling fluid may comprise the first cooling fluid, or vice versa. Also, in some other embodiments, the second cooling fluid may be in communication (i.e., without limitation, thermal communication) with the first cooling fluid. For example, in some embodiments, the second cooling fluid can act as a thermodynamic sink. The second cooling fluid can act to transfer at least a portion of the heat from the first cooling fluid (i.e., via a heat exchanger) and carry or transfer at least a portion of the heat to a fuel tank or other device wherein the second cooling fluid can transfer at least a portion of the heat to a fuel or another suitable fluid (i.e., via a second heat exchanger). In certain embodiments, the second cooling fluid can act to transfer at least a portion of the heat from the first cooling fluid (i.e., via a heat exchanger) and carry or transfer at least a portion of the heat to a fuel tank or other device wherein the second cooling fluid can combine or mix with the fuel or other suitable fluid. As described herein, in some embodiments wherein the heat sink comprises a second cooling fluid, the absorbed heat may eventually be transferred to the surrounding air via a radiator, or another suitable device, such that the temperature of the second cooling fluid is maintained.

In some embodiments, the heat sink 115 may comprise a fuel immediately prior to the fuel's injection into the combustion chamber. In other embodiments, the heat sink 115 may comprise bulk fuel, wherein the bulk fuel is the fuel that supplies the engine (e.g., the fuel in the vehicle's fuel tank).

The heat sink 115 may also be configured to comprise two or more different substances, wherein the two or more different substances may be maintained substantially independently or separately from each other, and wherein the two or more substances may be in communication (i.e., without limitation, thermal communication) with each other. For example, the heat sink 115 may comprise both a cooling fluid and a fuel, wherein the cooling fluid and the fuel are not present in the heat sink 115 as a mixture, but wherein the cooling fluid and the fuel are in thermal communication with each other. In some embodiments, the heat sink 115 may be coupled, or operatively coupled, to a heat exchanger and/or a radiator. For example, the heat sink 115 may be coupled to a heat exchanger, wherein the heat exchanger is configured to transfer heat between a cooling fluid which is in communication with the heat absorption element 102 and fluid fuel configured for later use. In various embodiments, the heat sink 115 may be thermally coupled to a first cooling fluid via a heat exchanger. In various other embodiments, the heat sink 115 may comprise a radiator.

The heat sink 115 may comprise an intermediate fluid, such as a second cooling fluid, in communication with both a first cooling fluid and fuel. In embodiments wherein the heat sink 115 comprises both a second cooling fluid and a fuel, the heat absorption element 102 may be configured such that at least a first portion of the absorbed heat in the heat absorption element 102 is transferred, for example via a first cooling fluid, to the second cooling fluid and at least a second portion of the absorbed heat is transferred to the fuel. In yet other embodiments, a fuel injector (not shown) may be configured to introduce at least a portion of the heated fuel from the heat sink 115 into the interior volume 125 of the combustion chamber 120 during a predetermined time period. For example, the fuel injector may introduce the heated fuel into the combustion chamber 120 during at least a portion of a power stroke. The heat transfer system 100, in combination with a fuel injector, a heat exchanger, and/or another device, can be configured to reintroduce the absorbed and/or transferred heat energy into the internal combustion engine to avoid, or at least partially avoid, removing the heat energy from the system. For example, introduction of the absorbed and/or transferred heat energy into the interior volume 125 of the combustion chamber 120 prior to and/or during the power stroke may necessarily increase the work done on the piston 150 during at least a portion of the power stroke.

In certain embodiments, the heat absorption element 102 may be configured to absorb more heat during a first time period in comparison to, or relative to, during a second time period. Stated another way, the heat absorption element 102 may be configured to comprise a greater heat absorption capacity during a first time period in comparison to, or relative to, during a second time period. For example, the first time period may comprise at least a portion of an intake stroke (i.e., prior to a compression stroke) and/or at least a portion of the compression stroke, and the second time period may comprise at least a portion of a power stroke. Other suitable time periods are also within the scope of this disclosure. In some embodiments, the second time period may comprise essentially all, or substantially all, of the power stroke. For example, a thermal conductance from the first combustion fluid and/or the interior volume 125 of the combustion chamber 120 to the first cooling fluid through or via the heat absorption element 102 may be configured to decrease during at least a portion, or during essentially all, of the power stroke. In other words, a heat conduction state of the heat absorption element 102 may be configured to change or oscillate over time. Further, the heat absorption element 102 may be configured to transition between a low thermal resistance state and a substantially non-heat-absorbing state. In some embodiments, the heat absorbing functions or properties of the heat absorption element 102 may be due to a mechanical and/or physical change of the heat absorption element 102. In certain other embodiments, the heat absorbing functions or properties of the heat absorption element 102 may be due to a functional or non-physical change of the heat absorption element 102.

In various embodiments, the heat absorption element 102 may comprise a phase change material. Heat absorption element 102 comprising a phase change material can be used to absorb heat within a fixed temperature range. Upon absorbing heat, the heat absorption element 102 comprising a phase change material can be cooled (i.e., via a circulating coolant, a heat pipe, etc.) such that at least a portion of the absorbed heat is drawn out of the phase change material. The transfer or drawing out of the heat from the phase change material can be configured to occur continuously or substantially continuously.

Absorption and/or transfer of heat energy from the interior volume 125 of the combustion chamber 120 during at least a portion of the compression stroke may decrease the amount of work required or used during the compression stroke. Whereas, absorption and/or transfer of heat energy from the interior volume 125 of the combustion chamber 120 during at least a portion of the power stroke may decrease the amount of work available to move the piston. In certain embodiments, the heat transfer system 100 and/or the heat absorption element 102 may be configured to cease or stop absorbing heat when a temperature in the combustion chamber 120 exceeds a specific or predetermined temperature or range of temperatures. For example, the transition of the heat absorption element 102 from the low thermal resistance state and the substantially non-heat-absorbing state may be due to decreasing or eliminating flow of a coolant through the heat absorption element 102. In another configuration, the transition of the heat absorption element 102 from the low thermal resistance state and the substantially non-heat-absorbing state may be due to alternating the flow of the coolant through the heat absorption element 102 with the flow of a gas, wherein the gas absorbs less heat than the coolant or wherein the gas is configured to absorb less heat than the coolant. The heat absorption element 102 may absorb heat, or significant heat, while the heat absorption element 102 is undergoing a phase change and the heat absorption element 102 may absorb less heat, or much less heat, when the phase change is complete (i.e., when the phase change material has melted or vaporized).

Figure 2A:
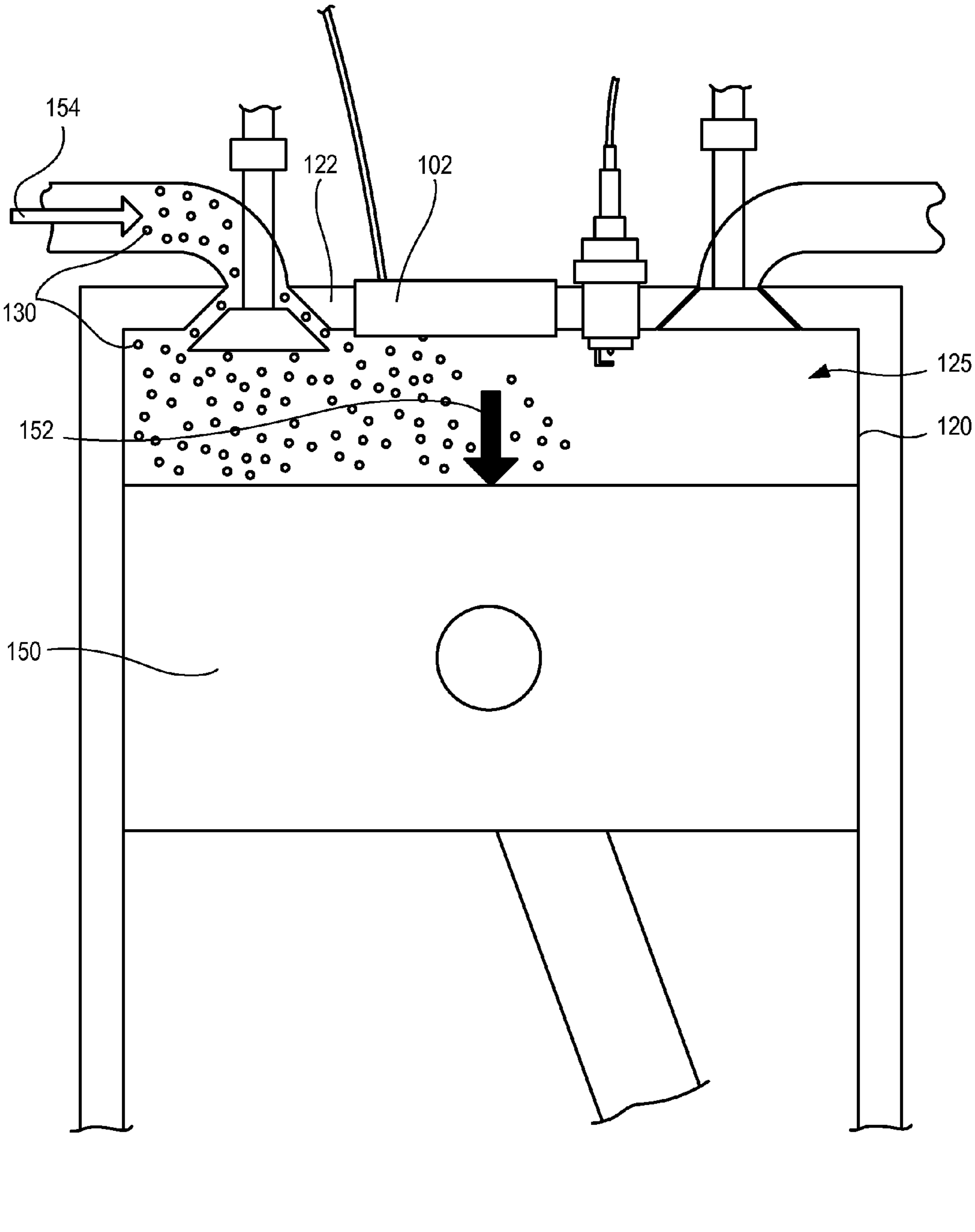
FIG. 2A is a schematic illustration of a portion of a cylinder during an intake stroke of the portion of the embodiment of the engine of FIG. 1.

FIGS. 2A-2D are schematic depictions of various stages of a single thermodynamic cycle of the embodiment of the spark-ignition internal combustion engine of FIG. 1. FIG. 2A schematically illustrates an embodiment of a time point during an intake stroke. During the depicted intake stroke, the piston 150 moves downward, as shown by an arrow 152. Directional terms, such as "downward," "upward," "top," "bottom," etc., are used herein with reference to the direction of compression in the illustrated embodiment of the combustion chamber. The terms are used for the sake of convenience and are not necessarily intended to be limiting. For example, a second embodiment of a spark-ignition internal combustion engine may be oriented substantially inverse to that of the embodiment illustrated in FIGS. 2A-2D such that in the second embodiment, movement of a piston during an intake stroke may be depicted as being "upward."

Referring again to FIG. 2A, the downward movement of the piston 150 may draw or introduce a fresh charge of, or a volume of, the first combustion fluid 130 into the interior volume 125 of the combustion chamber 120, as shown by an arrow 154. As illustrated, the heat absorption element 102 is disposed in a wall 122 of the combustion chamber 120. As discussed above, other positions of the heat absorption element 102 are also within the scope of this disclosure. In some embodiments, the heat absorption element 102 may comprise a plurality of channels configured for flow or passage of the first cooling fluid. In certain embodiments, the channels may be microchannels, also referred to herein as microchannel heat transfer elements. As used herein, a microchannel is a channel comprising laminar flow at operating conditions and a height-to-width ratio of approximately 1 or greater. As such, at typical pressures and flow velocities for cooling, one dimension of a microchannel comprising a liquid may be between approximately 10 micrometers and approximately 100 micrometers, and one dimension of a microchannel comprising a gas may be between approximately 100 micrometers and approximately 1,000 micrometers. The aspect ratio of a microchannel heat exchanger may distinguish a microchannel heat exchanger from a simple film heat exchanger, wherein a heat-absorbing fluid may simply flow along one side of a plate.

In some embodiments, the first cooling fluid may be circulated, pumped, or transported by a pump or another suitable device. For example, the first cooling fluid and the heat absorption element 102 may be part of a closed-loop system coupled to a pump (not shown), wherein the pump may be configured to circulate, pump, or transport the first cooling fluid. Further, referring again to FIG. 1, the closed-loop system may comprise at least the heat absorption element 102, the thermal transfer element 106, the heat sink 115, and the first cooling fluid. In another example, the first cooling fluid may be a component of a main engine cooling system, or preexisting engine cooling system, wherein the cooling fluid is pressurized by a pump. In some other embodiments, the first cooling fluid may be circulated, pumped, or transported by at least partial compression of the plurality of channels, or the plurality of microchannel heat transfer elements, as the charge is compressed by the piston 150.

Figure 2B:
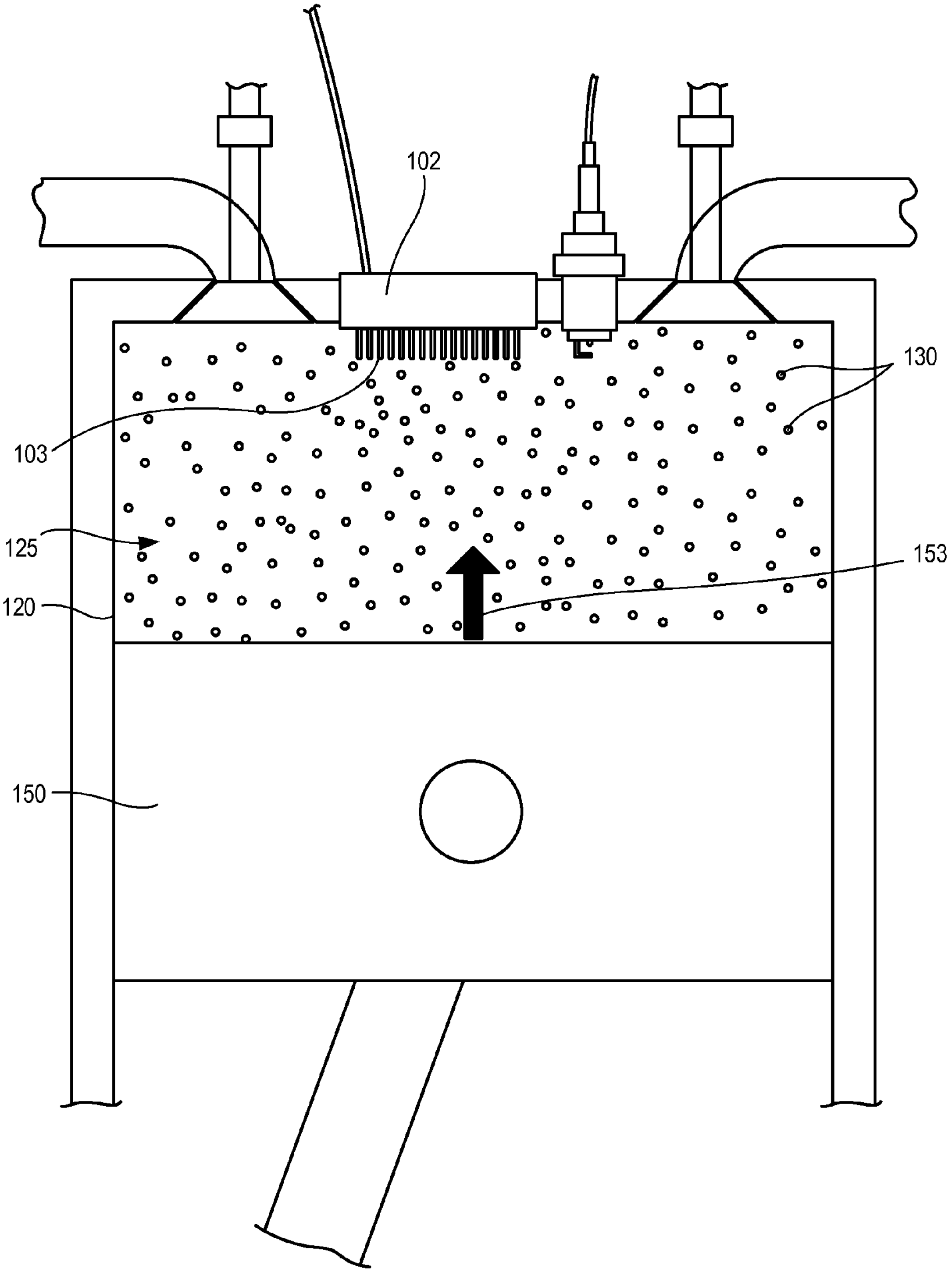
FIG. 2B is a schematic illustration of a portion of a cylinder during a compression stroke of the portion of the embodiment of the engine of FIG. 1.

FIG. 2B is a schematic illustration of a time point during a compression stroke of the embodiment of the engine of FIG. 1. During the compression stroke, the piston 150 moves upward, as shown by an arrow 153. As the piston 150 moves upward the first combustion fluid 130 is compressed, which may generate heat. Compression of a constant mass of a fluid will raise the temperature of the fluid. During the intake stroke, high surface area structures (e.g., fins, pins, etc.) comprising a plurality of microchannel heat transfer elements 103 may be deployed from the heat absorption element 102. Deployment of the plurality of microchannel heat transfer elements 103 can increase a surface area of the plurality of microchannel heat transfer elements 103 available for heat transfer and may aid in the transfer of heat from the first combustion fluid 130. In the illustrated embodiment, the heat absorption element 102 comprises a plurality of microchannel heat transfer elements 103, wherein the plurality of microchannel heat transfer elements 103 forms a plate comprising an array of pins, or a pin grid array. Other configurations of the channels and/or microchannel heat transfer elements are also contemplated. For example, a plurality of individual microchannel heat transfer elements that are only coupled to one another at the heat absorption element 102 may deploy into the interior volume 125 of the combustion chamber 120, wherein the microchannel heat transfer elements may further comprise one or more one-way valves. In some embodiments, the plurality of microchannel heat transfer elements 103 may form a substantially net- or web-like lattice or structure. The plurality of microchannel heat transfer elements 103 may also comprise an open porous or mesh-like structure (e.g., a mesh-like plate). In some configurations, the plurality of microchannel heat transfer elements 103 may comprise an array of grid-like fins, or a series of fins. The plurality of microchannel heat transfer elements 103 may extend or spread out into the interior volume 125 of the combustion chamber 120 from a single entrance point to the interior volume 125 of the combustion chamber 120. Additionally, the plurality of microchannel heat transfer elements 103 may extend into and retract out of the interior volume 125 of the combustion chamber 120 at multiple or various time points. The plurality of microchannel heat transfer elements 103 may also be valve-like or the plurality of microchannel heat transfer elements 103 may fold out from and back against a head or a wall of the combustion chamber 120.

In various embodiments, the plurality of microchannel heat transfer elements 103 may be configured to transition between a low-profile configuration and a deployed configuration. During the compression stroke, the plurality of microchannel heat transfer elements 103, as illustrated, can deploy into at least a portion of the interior volume 125 of the combustion chamber 120. For example, the plurality of microchannel heat transfer elements 103 may be configured to transition from the low-profile configuration of FIG. 2A to the deployed configuration of FIG. 2B. In some embodiments, the piston 150 may be configured such that it does not contact the heat absorption element 102 and/or the plurality of microchannel heat transfer elements 103. Such a configuration may decrease or minimize the possibility of damaging, or increasing wear on, the heat absorption element 102 and/or the plurality of microchannel heat transfer elements 103. When in the deployed configuration, the plurality of microchannel heat transfer elements 103 may be configured to transfer more heat from the combustion chamber 120 than when the plurality of microchannel heat transfer elements 103 is in the low-profile configuration. Other configurations, as discussed above, wherein the transition between a high heat-transfer state and a low heat-transfer state may not comprise mechanical and/or physical transformation of the heat absorption element 102 are also within the scope of this disclosure. As such, the other embodiments disclosed herein may be adapted to comprise a non-mechanical and/or non-physical transition of the heat absorption element 102. The plurality of microchannel heat transfer elements 103 may also be configured to transfer heat from the interior volume 125 of the combustion chamber 120 to a heat sink (not shown) via a first cooling fluid. In some embodiments, the plurality of microchannel heat transfer elements 103 may be substantially flexible, while in some other embodiments, the plurality of microchannel heat transfer elements 103 may be substantially rigid.

In certain embodiments, heating of a fuel component of the first combustion fluid 130 prior to its introduction into the interior volume 125 of the combustion chamber 120 may increase the vapor pressure of the first combustion fluid 130 and thus may impact the vaporization intake quality upon injection of the first combustion fluid 130. In certain embodiments, the heating of the first combustion fluid 130 may facilitate the use of "heavy" diesel fuel as the first combustion fluid 130 in spark-ignition internal combustion engines as it may permit increased vapor pressure upon introduction of the first combustion fluid 130 into the interior volume 125 of the combustion chamber 120.

In other embodiments, at least a portion of the heat absorption element 102 may be configured to transition from the low-profile configuration to the deployed configuration for a first time period, and at least a portion of the heat absorption element 102 may be further configured to transition from the deployed configuration to the low-profile configuration for a second time period. The first time period may comprise at least a portion of the intake stroke (i.e., prior to the compression stroke) and/or at least a portion of the compression stroke, and the second time period may comprise a least a portion of a power stroke. In yet other embodiments, the second time period may comprise essentially all, or substantially all, of the power stroke. Transition of at least a portion of the heat absorption element 102 during other time periods is also contemplated. The transitions from the low-profile configuration to the deployed configuration, and vice versa, may be driven hydraulically, mechanically, pneumatically, etc. In some embodiments, the transitions from the low-profile configuration to the deployed configuration, and vice versa, may be driven at least partially by pressure in the cylinder. For example, attaining or exceeding a predetermined pressure within the cylinder and/or onset of combustion may at least partially activate or aid in the transition of the heat absorption element 102 from the deployed configuration to the low-profile configuration.

Figure 2C:
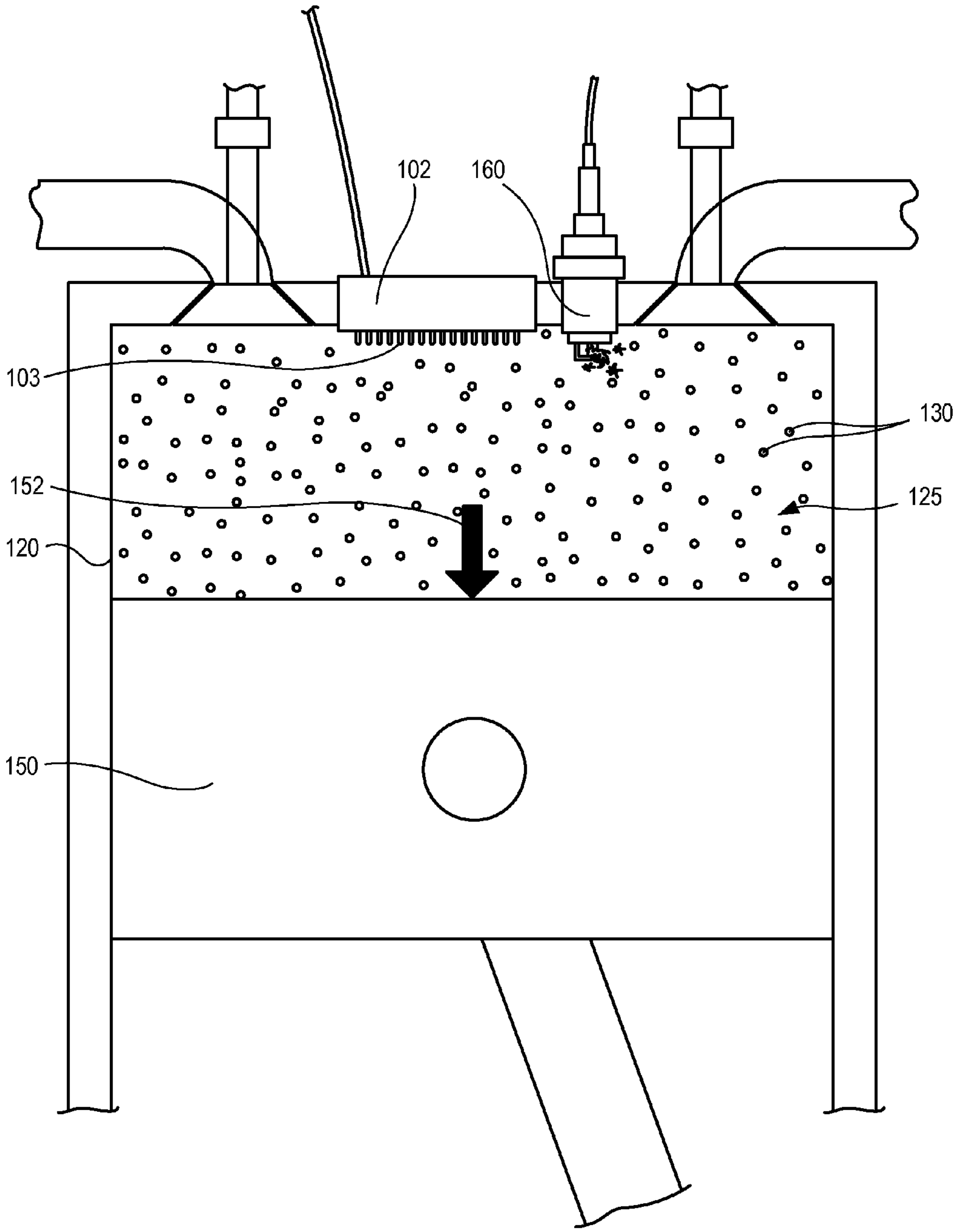
FIG. 2C is a schematic illustration of a portion of a cylinder during a power stroke of the portion of the embodiment of the engine of FIG. 1.

FIG. 2C schematically illustrates a time point during a power stroke of the embodiment of the engine of FIG. 1. As the piston 150 approaches or reaches a top portion, or head, of the combustion chamber 120, a spark plug 160 may fire or spark, igniting the compressed first combustion fluid 130. The ignition and burning of the first combustion fluid 130 can cause the volume of the first combustion fluid 130 to expand, which is configured to force or push the piston 150 downward as indicated by the arrow 152. As illustrated, the plurality of microchannel heat transfer elements 103 can transition from the deployed configuration to the low-profile configuration during at least a portion of the power stroke. Stated another way, at least a portion of the heat absorption element 102 may be configured to be at least partially withdrawn from the interior volume 125 of the combustion chamber 120 between at least a portion of the compression stroke and at least a portion of the power stroke. As stated above, such a configuration may limit heat loss, and therefore power loss, during at least a portion of the power stroke. In other embodiments, a shape of a heat absorption element, like heat absorption element 102, may be configured to change between at least a portion of a compression stroke and at least a portion of a power stroke. A surface area of the heat absorption element may also be configured to change or decrease between at least a portion of the compression stroke and at least a portion of the power stroke. In still other embodiments, a position of the heat absorption element may be configured to change between at least a portion of the compression stroke and at least a portion of the power stroke. For example, the position of the heat absorption element may change such that the heat absorption element is no longer in communication, or thermal communication, with an interior volume of a combustion chamber. In some embodiments, the heat absorption element 102 may also be configured to make or undergo a functional transformation and not a mechanical and/or physical transformation.

Figure 2D:
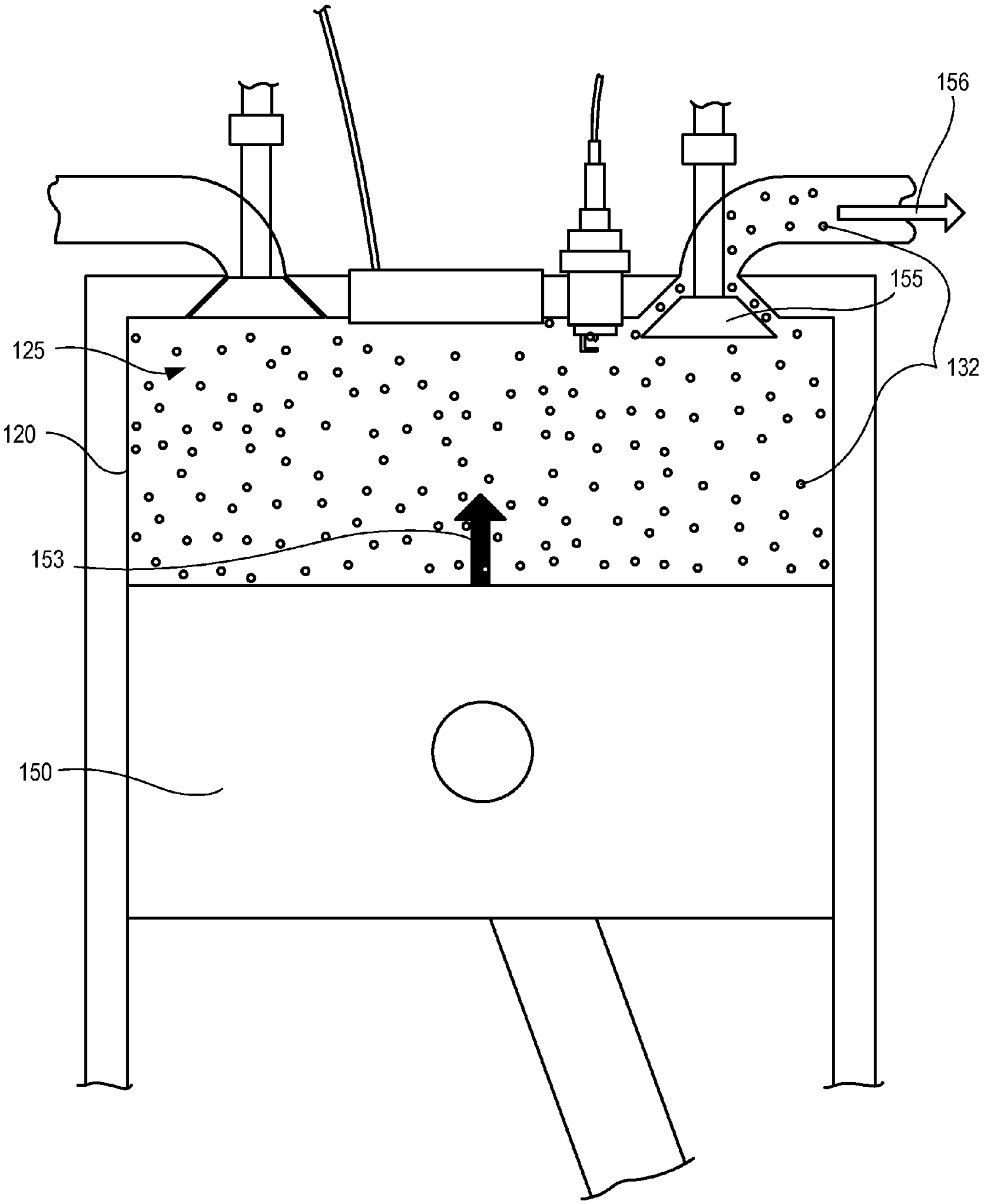
FIG. 2D is a schematic illustration of a portion of a cylinder during an exhaust stroke of the portion of the embodiment of the engine of FIG. 1.

FIG. 2D is a schematic depiction of a time point during an exhaust stroke of the embodiment of the engine of FIG. 1. As illustrated, after the above-described power stroke an exhaust valve 155 may open, and upward movement of the piston 150, as depicted by the arrow 153, can force the burned or exhausted first combustion fluid 132 from the interior volume 125 of the combustion chamber 120, as illustrated by arrow 156.

Figure 3:
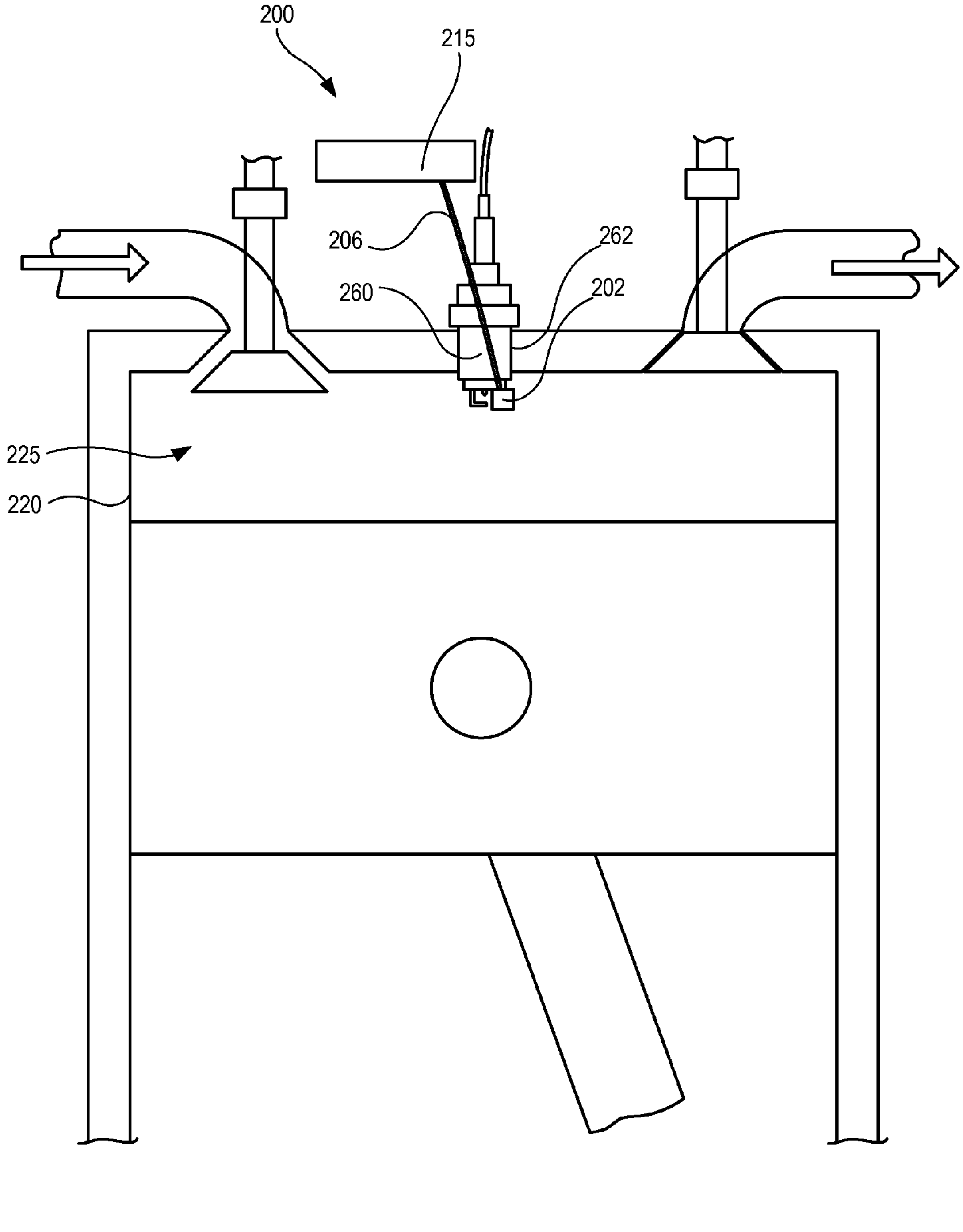
FIG. 3 is a schematic illustration of the portion of the embodiment of the engine of FIG. 1 comprising another embodiment of a heat transfer system.
Figure 4:
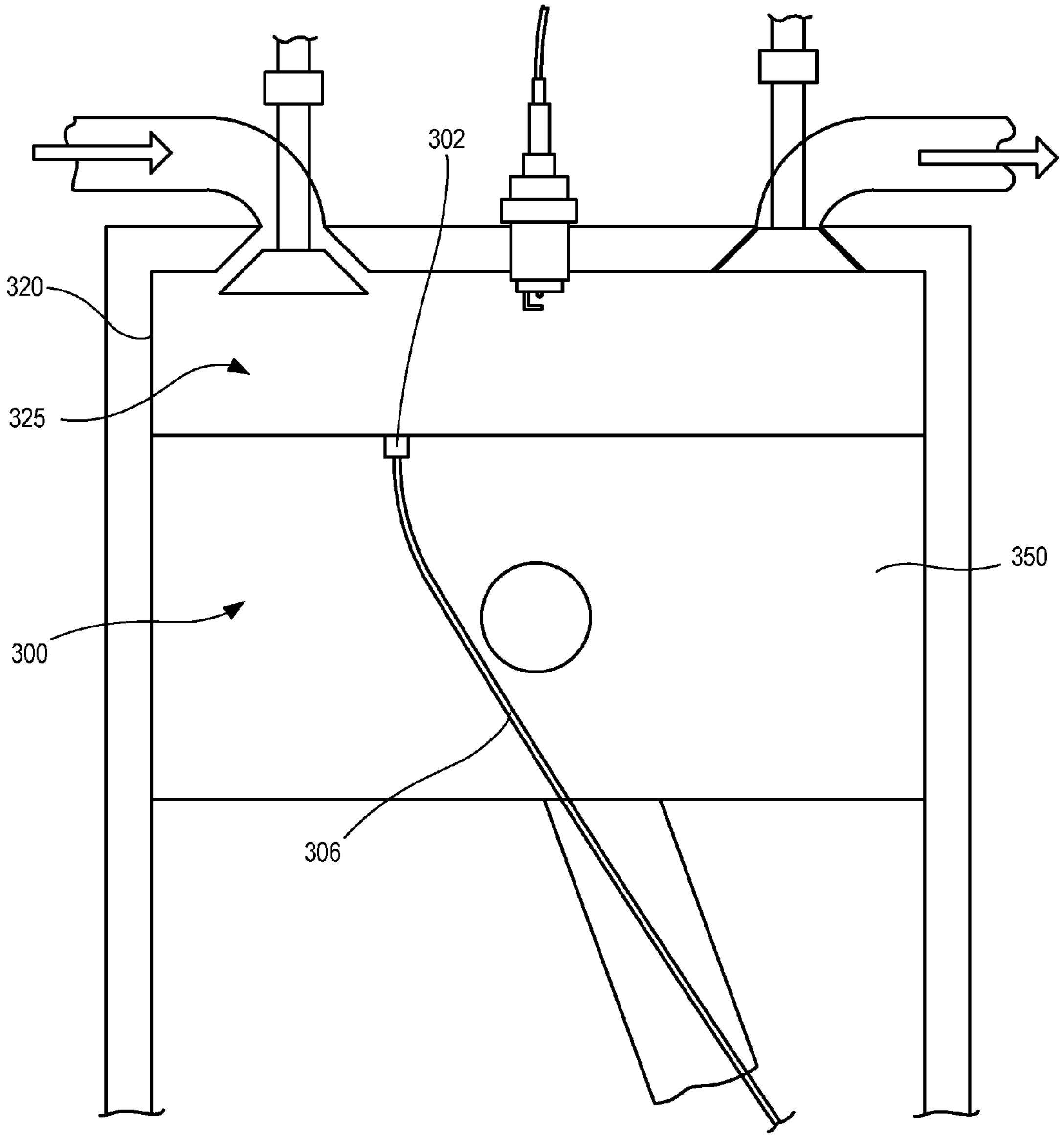
FIG. 4 is a schematic illustration of the portion of the embodiment of the engine of FIG. 1 comprising another embodiment of a heat transfer system.

FIGS. 3 and 4 are schematic illustrations of portions of other embodiments of spark-ignition internal combustion engines comprising two other embodiments of a heat transfer system 200, 300. The embodiments of FIGS. 3 and 4 may include components that resemble components of the embodiment of FIGS. 1-2D in some respects. For example, the embodiment of FIG. 3 includes a schematic element designated as a heat absorption element 202 of the heat transfer system 200, and the embodiment of FIG. 4 includes a schematic element designated as a heat absorption element 302 of the heat transfer system 300, which may resemble the schematic representation of the heat absorption element 102 of FIG. 1. Accordingly, like or analogous features are designated with like reference numerals, with the leading digits incremented to "2" and "3," respectively. Relevant disclosure set forth above regarding similarly identified features thus may not be repeated hereafter. Moreover, specific features of the system and related components shown in FIGS. 3 and 4 may not be shown or identified by a reference numeral in the drawings or specifically discussed in the written description that follows. However, such features may clearly be the same, or substantially the same, as features depicted in other embodiments and/or described with respect to such embodiments. Accordingly, the relevant descriptions of such features apply equally to the features of the system and related components of FIGS. 3 and 4. Any suitable combination of the features, and variations of the same, described with respect to the system and components illustrated in FIGS. 1-2D, can be employed with the system and components of FIGS. 3 and 4, and vice versa. This pattern of disclosure applies equally to further embodiments depicted in subsequent figures and described hereafter.

It will be appreciated by one of skill in the art having the benefit of this disclosure that the heat transfer systems 200, 300 of FIGS. 3 and 4 may function in an analogous manner to the heat transfer system 100 described in connection with FIGS. 1-2D. Thus, while specific features and elements of the subsequent heat transfer systems 200, 300 will be described below, disclosure above regarding the relationship of components and the function of the heat transfer system 100 of FIGS. 1-2D may be applied to the heat transfer systems 200, 300 of FIGS. 3 and 4. Again, this pattern of disclosure applies to subsequent disclosure as well: disclosure relative to any embodiment may be analogously applied to any other embodiment herein.

In certain embodiments, the heat transfer systems 100, 200, 300 may be configured to be retrofitted into an embodiment of an existing spark-ignition internal combustion engine. With reference to FIG. 3, a heat transfer system 200 can comprise a heat absorption element 202 configured to be disposed within an interior volume 225 of a combustion chamber 220. The heat absorption element 202 may be configured to absorb heat from the interior volume 225 of the combustion chamber 220. The heat transfer system 200 can also comprise a thermal transfer element 206, wherein the thermal transfer element 206 is in communication, or fluid communication, with the heat absorption element 202. As shown, the thermal transfer element 206 can be configured to extend at least from a first position at or adjacent the heat absorption element 202 to a second position outside of the combustion chamber 220. The thermal transfer element 206 may comprise a fluid flow path or a heat pipe.

In some embodiments, the thermal transfer element 206 may comprise a fluid flow path. The fluid flow path may be configured to transfer heat from the heat absorption element 202 to a heat sink 215. For example, the fluid flow path may comprise a first cooling fluid wherein the first cooling fluid flows and/or circulates through the fluid flow path between at least the heat absorption element 202 and the heat sink 215. As described above, a pump may be coupled to the thermal transfer element 206 and the pump may be configured to circulate the first cooling fluid between at least the heat absorption element 202 and the heat sink 215. The heat sink 215, as also described above, may comprise a second cooling fluid and/or any other suitable fluid or substance. In some embodiments, the heat sink 215 may be coupled, or operatively coupled, to a heat exchanger and/or a radiator. In various embodiments, the heat sink 215 may be thermally coupled to a first cooling fluid via a heat exchanger. In various other embodiments, the heat sink 215 may comprise a radiator.

In other embodiments, the thermal transfer element 206 may comprise a heat pipe. The heat pipe may be configured to transfer heat from the heat absorption element 202 to the heat sink 215. In some embodiments, the heat pipe may be configured to discard or transfer all or at least a portion of the heat absorbed by the heat absorption element 202 to a position outside of the combustion chamber 220 (i.e., without limitation, the heat sink 215). As described above in connection with the fluid flow path, the heat sink 215 in communication with the heat pipe may also comprise a second cooling fluid and/or any other suitable fluid or substance. In some embodiments, a heat pipe may comprise a cooling fluid, wherein the cooling fluid may evaporate in the interior volume 225 of the combustion chamber 220, or cylinder, condense in the heat sink 215, and be pumped or transferred back to a head of the cylinder, or to another position at or adjacent the cylinder, via a capillary wick, wherein the capillary wick may be disposed within, or operatively coupled to, the heat pipe.

Referring again to FIG. 3, the interior volume 225 of the combustion chamber 220 of the embodiment of an existing spark-ignition internal combustion engine comprises a predetermined compression ratio. Upon retrofitting of the existing engine, the heat absorption element 202, and/or the thermal transfer element 206, may occupy at least a portion of the interior volume 225 of the combustion chamber 220. In such an embodiment, the heat absorption element 202, and/or the thermal transfer element 206, can alter the predetermined compression ratio of the combustion chamber 220.

As shown, the heat absorption element 202, and/or the thermal transfer element 206, is at least partially disposed through an existing aperture of the combustion chamber 220 (i.e., a spark plug 260 aperture 262). In some embodiments, the heat transfer system 200 configured for retrofitting an existing spark-ignition internal combustion engine may comprise a spark plug element. For example, the heat absorption element 202 may be configured to provide a spark similar to that provided by a spark plug. In other embodiments, the heat absorption element 202 may be coupled to, or disposed into a portion of, a spark plug. Thus, retrofitting an existing engine may comprise replacing an existing or stock spark plug with a device or an element configured to occupy the spark plug aperture, contain at least a portion of the heat transfer system, and provide a spark.

Referring to FIG. 4, the heat transfer system 300 may be at least partially disposed within, or coupled to, a piston 350. As illustrated, the heat absorption element 302 may be at least partially disposed within the piston 350 such that the heat absorption element 302 is in communication, or thermal communication, with an interior volume 325 of a combustion chamber 320. The heat transfer system 300 can also comprise a thermal transfer element 306, wherein the thermal transfer element 306 is in communication with the heat absorption element 302. As described above in connection with the embodiment of FIG. 3, the thermal transfer element 306 can be configured to extend at least from a first position at or adjacent the heat absorption element 302 to a second position outside of the combustion chamber 320. Thus, retrofitting may comprise installation of a new piston so configured. Other locations or positions within an embodiment of an existing spark-ignition internal combustion engine may also be suitable for the disposition of another embodiment of a heat transfer system, similar to heat transfer systems 100, 200, 300.

In some embodiments, a spark-ignition internal combustion engine system can comprise one or more variable-volume combustion chambers, similar to combustion chambers 120, 220, 320. The spark-ignition internal combustion engine system may further comprise a heat transfer system, similar to heat transfer systems 100, 200, 300, comprising one or more heat absorption elements, wherein each heat absorption element may be in communication with at least one of the variable-volume combustion chambers. Heat absorption elements, as disclosed, may also be configured to absorb heat from interior volumes of the variable-volume combustion chambers.

Figure 5:
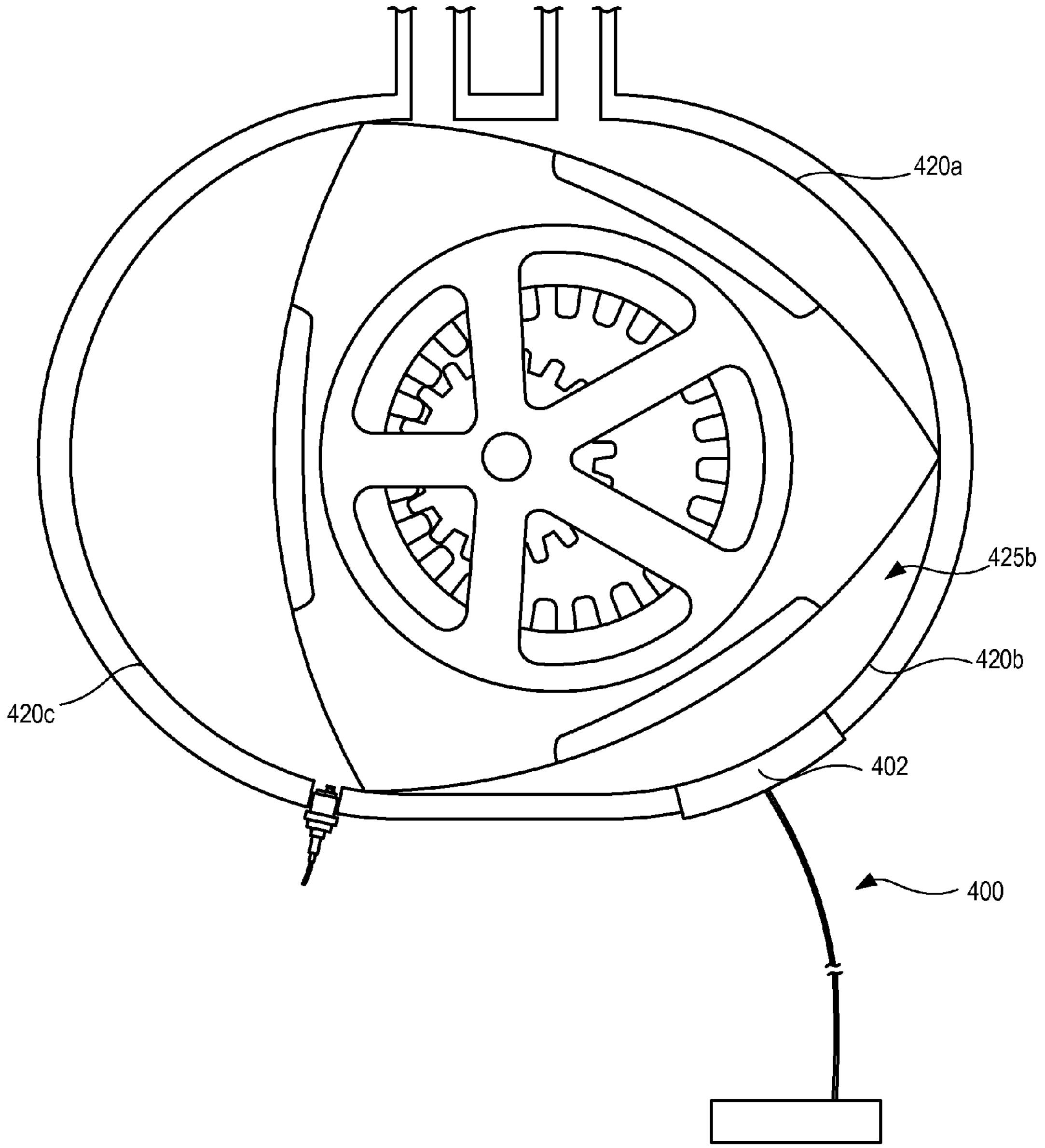
FIG. 5 is a schematic illustration of a portion of an embodiment of a rotary internal combustion engine comprising an embodiment of a heat transfer system.

FIG. 5 depicts a schematic embodiment of a rotary, or Wankel, internal combustion engine comprising a plurality of variable-volume combustion chambers 420*a*, 420*b*, 420*c*. As illustrated, a heat transfer system 400 comprising a heat absorption element 402 can be disposed in communication, or thermal communication, with an interior volume 425*b* of the variable-volume combustion chamber 420*b*. In certain embodiments, the heat absorption element 402 may be configured to absorb heat from the interior volume 425*b* of the variable-volume combustion chamber 420*b*.

Figure 6A:
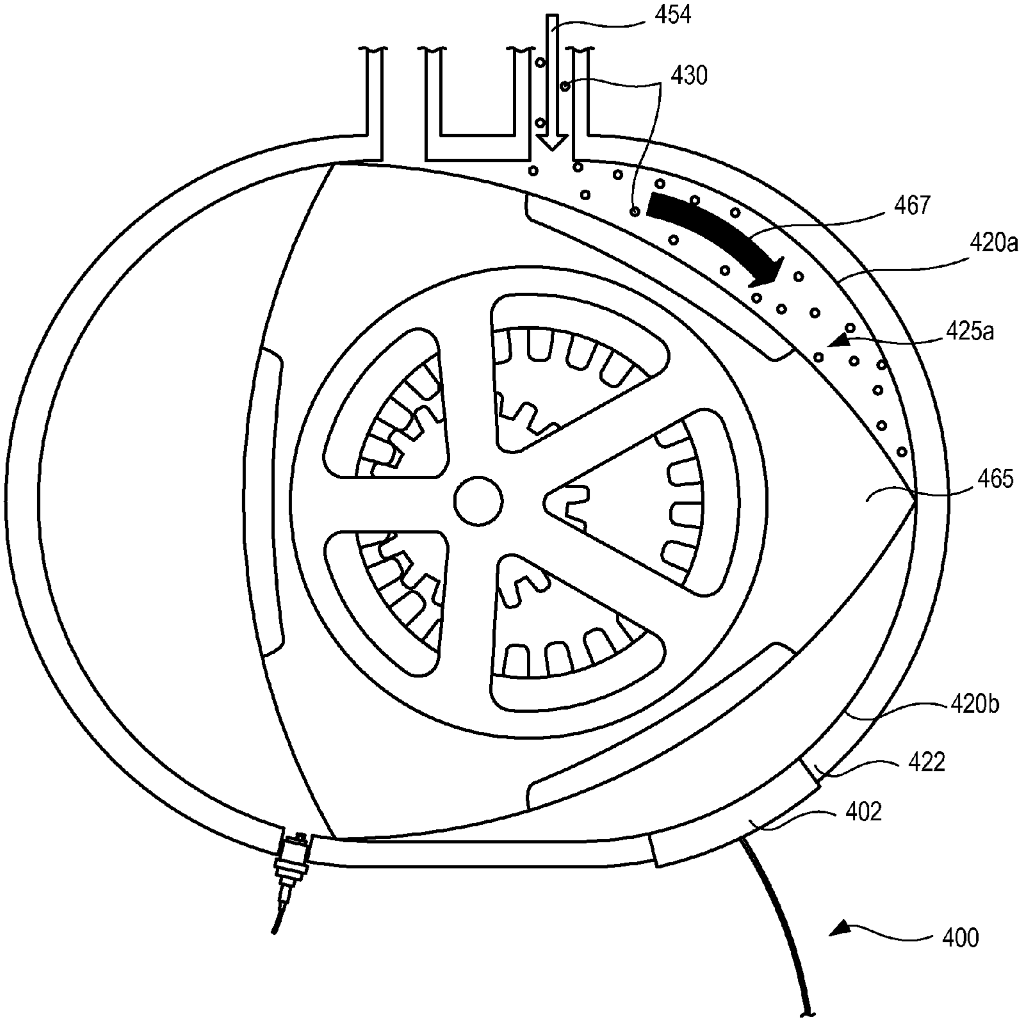
FIG. 6A is a schematic illustration of a portion of a cylinder during an intake stroke of the portion of the embodiment of the engine of FIG. 5.

FIGS. 6A-6D schematically depict various stages of a single thermodynamic cycle of the embodiment of the rotary internal combustion engine of FIG. 5. FIG. 6A is a schematic illustration of a time point during an intake stroke of the embodiment of the engine of FIG. 5. During the depicted intake stroke, rotation of a rotor 465, as indicated by an arrow 467, can draw or introduce a fresh charge, or a volume, of a first combustion fluid 430 into the interior volume 425*a* of the variable-volume combustion chamber 420*a*, as indicated by an arrow 454. As illustrated, the heat absorption element 402 is disposed in a wall 422 of the variable-volume combustion chamber 420*b*.

Figure 6B:
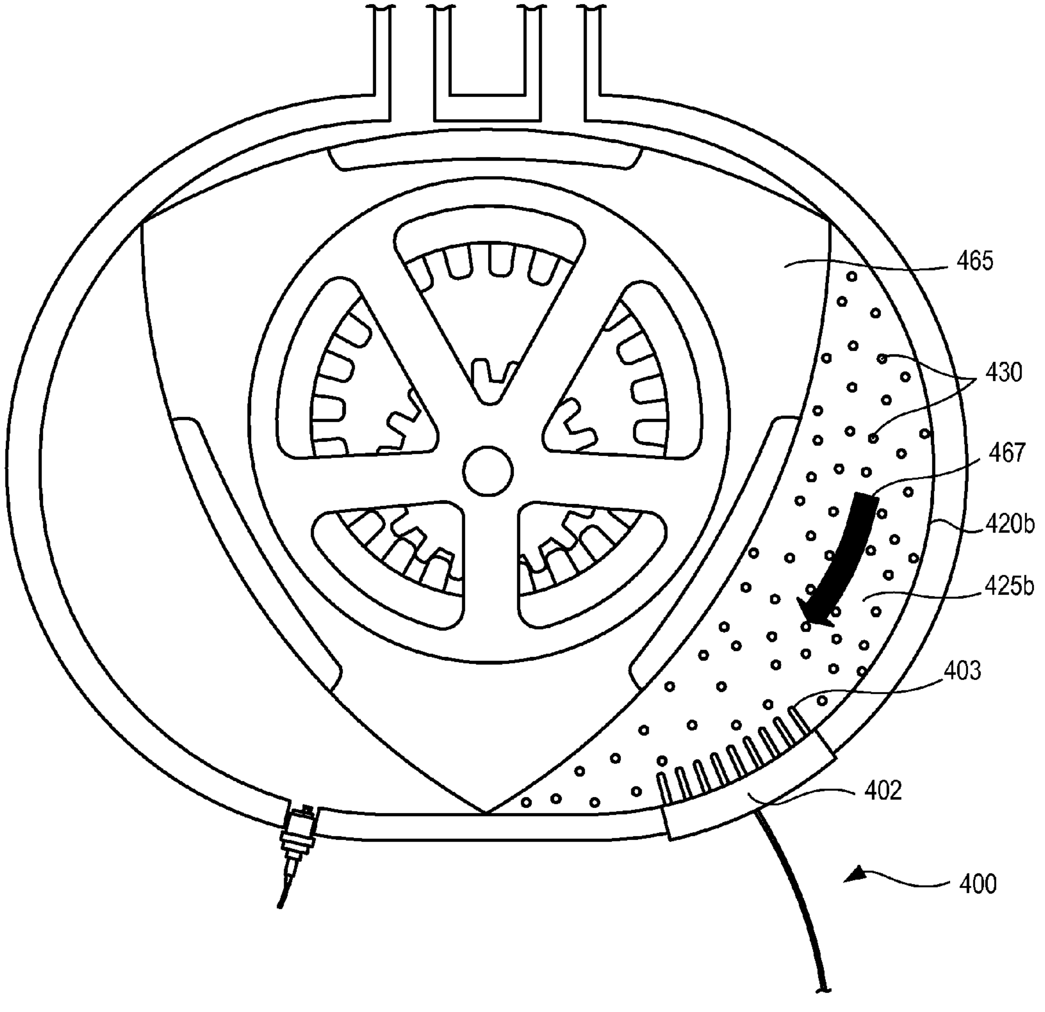
FIG. 6B is a schematic illustration of a portion of a cylinder during a compression stroke of the portion of the embodiment of the engine of FIG. 5.

FIG. 6B schematically illustrates a time point during a compression stroke of the embodiment of the engine of FIG. 5. During the depicted compression stroke, the rotor 465 continues its rotation, as shown by the arrow 467, and the rotor 465 compresses the first combustion fluid 430. The compression of the first combustion fluid 430 can generate heat. In the illustrated embodiment, the heat absorption element 402 comprises a plurality of microchannel heat transfer elements 403, wherein the plurality of microchannel heat transfer elements 403 forms a plate comprising an array of pins. Other embodiments of the heat absorption element 402 are also contemplated. For example, as described above, a plurality of individual microchannel heat transfer elements that are only coupled to one another at the heat absorption element 402 may deploy into the interior volume 425*b* of the combustion chamber 420*b*. In some embodiments, the plurality of microchannel heat transfer elements 403 may form a substantially net- or web-like lattice or structure. The plurality of microchannel heat transfer elements 403 may also comprise an open porous or mesh-like structure (e.g., a mesh-like plate). In some configurations, the plurality of microchannel heat transfer elements 403 may comprise an array of grid-like fins, or a series of fins. The plurality of microchannel heat transfer elements 403 may extend or spread out into the interior volume 425*b* of the combustion chamber 420*b* from a single entrance point to the interior volume 425*b* of the combustion chamber 420*b*. Additionally, the plurality of microchannel heat transfer elements 403 may extend into and retract out of the interior volume 425*b* of the combustion chamber 420*b* at multiple or various time points. The plurality of microchannel heat transfer elements 403 may also be valve-like or the plurality of microchannel heat transfer elements 403 may fold out from and back against a head or a wall of the combustion chamber 420*b*. In some embodiments, the plurality of microchannel heat transfer elements 403 may be substantially rigid.

During the compression stroke, the plurality of microchannel heat transfer elements 403 may deploy into at least a portion of the interior volume 425*b* of the variable-volume combustion chamber 420*b*. For example, the plurality of microchannel heat transfer elements 403 may be configured to transition from a low-profile configuration, as shown in FIG. 6A, to a deployed configuration, as shown in FIG. 6B. When in the deployed configuration, the plurality of microchannel heat transfer elements 403 may be configured to transfer more heat from the variable-volume combustion chamber 420*b* than when the plurality of microchannel heat transfer elements 403 is in the low-profile configuration. The plurality of microchannel heat transfer elements 403 and/or heat transfer system 400 may be further configured to absorb and transfer heat from the interior volume 425*b* of the variable-volume combustion chamber 420*b* to a heat sink (not shown) via a first cooling fluid. The heat transfer system 400 may be configured to reduce an amount of work required or used to compress the first combustion fluid 430.

Again, as described above, the heat absorption element 402 may be configured to transition from the low-profile configuration to the deployed configuration for a first time period, and the heat absorption element 402 may be further configured to transition from the deployed configuration to the low-profile configuration for a second time period. The first time period may comprise at least a portion of the intake stroke (i.e., prior to the compression stroke) and/or at least a portion of the compression stroke, and the second time period may comprise a least a portion of a power stroke. In yet other embodiments, the second time period may comprise essentially all, or substantially all, of the power stroke. Other suitable time periods are also contemplated.

Figure 6C:
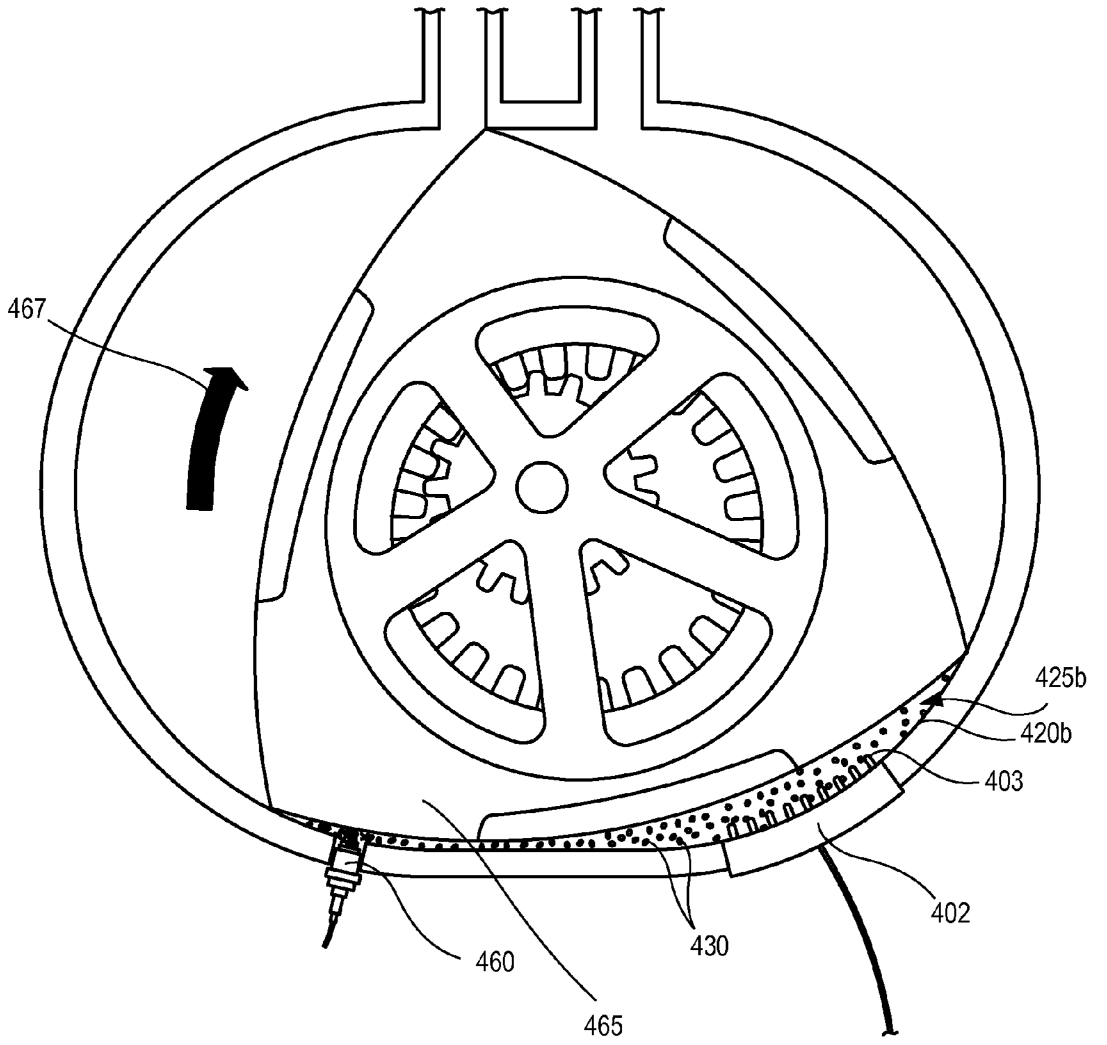
FIG. 6C is a schematic illustration of a portion of a cylinder during a power stroke of the portion of the embodiment of the engine of FIG. 5.

FIG. 6C is a schematic illustration of a time point during a power stroke of the embodiment of the engine of FIG. 5. A spark plug 460 can be configured to fire or spark, thus igniting and burning the compressed first combustion fluid 430. Ignition and burning of the first combustion fluid 430 causes the volume of the first combustion fluid 430 to expand, which at least partially drives the continued rotation of the rotor 465, as depicted by the arrow 467. As illustrated, the plurality of microchannel heat transfer elements 403 can transition from the deployed configuration to the low-profile configuration. Stated another way, at least a portion of the heat absorption element 402 may be configured to be at least partially withdrawn from the interior volume 425*b* of the variable-volume combustion chamber 420*b* between at least a portion of the compression stroke and at least a portion of the power stroke. In other embodiments, a shape of a heat absorption element, like heat absorption element 402, may be configured to change between at least a portion of the compression stroke and at least a portion of the power stroke. A surface area of the heat absorption element may also be configured to change or decrease between at least a portion of the compression stroke and at least a portion of the power stroke. In still other embodiments, a position of the heat absorption element may be configured to change between at least a portion of the compression stroke and at least a portion of the power stroke. For example, the position of the heat absorption element may change such that the heat absorption element is no longer in communication with an interior volume of a variable-volume combustion chamber. In some embodiments, the heat absorption element 402 may also be configured to make or undergo a functional transformation and not a mechanical and/or physical transformation.

Figure 6D:
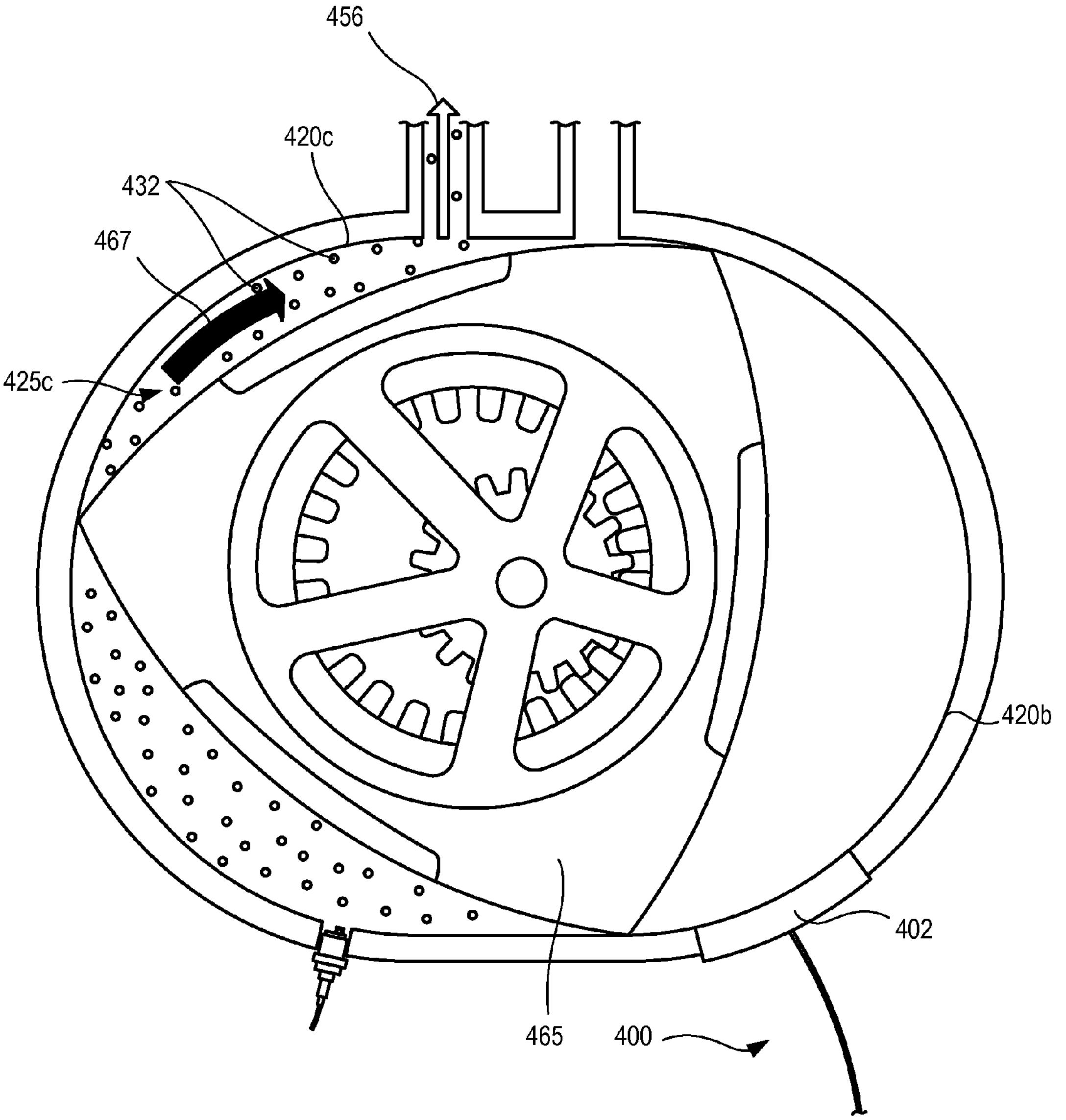
FIG. 6D is a schematic illustration of a portion of a cylinder during an exhaust stroke of the portion of the embodiment of the engine of FIG. 5.

FIG. 6D schematically depicts a time point during an exhaust stroke of the embodiment of the engine of FIG. 5. As the rotor 465 continues to rotate, as indicated by the arrow 467, a burned or an exhausted first combustion fluid 432 is expelled, or exits, from the interior volume 425*c* of the variable-volume combustion chamber 420*c*, as illustrated by an arrow 456.

In some embodiments, the heat transfer system 400 may be configured to transfer a greater portion of the total amount of heat absorbed from the variable-volume combustion chamber 420*b* during at least a portion of the compression stroke as compared to, or in relation to, during at least a portion of the power stroke. For example, the heat absorption element 402 may be configured to comprise better thermal coupling during at least a portion of the compression stroke as compared to during at least a portion of the power stroke. As described in connection with other embodiments of a heat transfer system, at least a portion of the heat transfer system 400 may be disposed, or positioned, at other locations within an embodiment of a rotary internal combustion engine. For example, at least a portion of an embodiment of a heat transfer system 400 may be disposed in a rotor 465.

Figure 7:
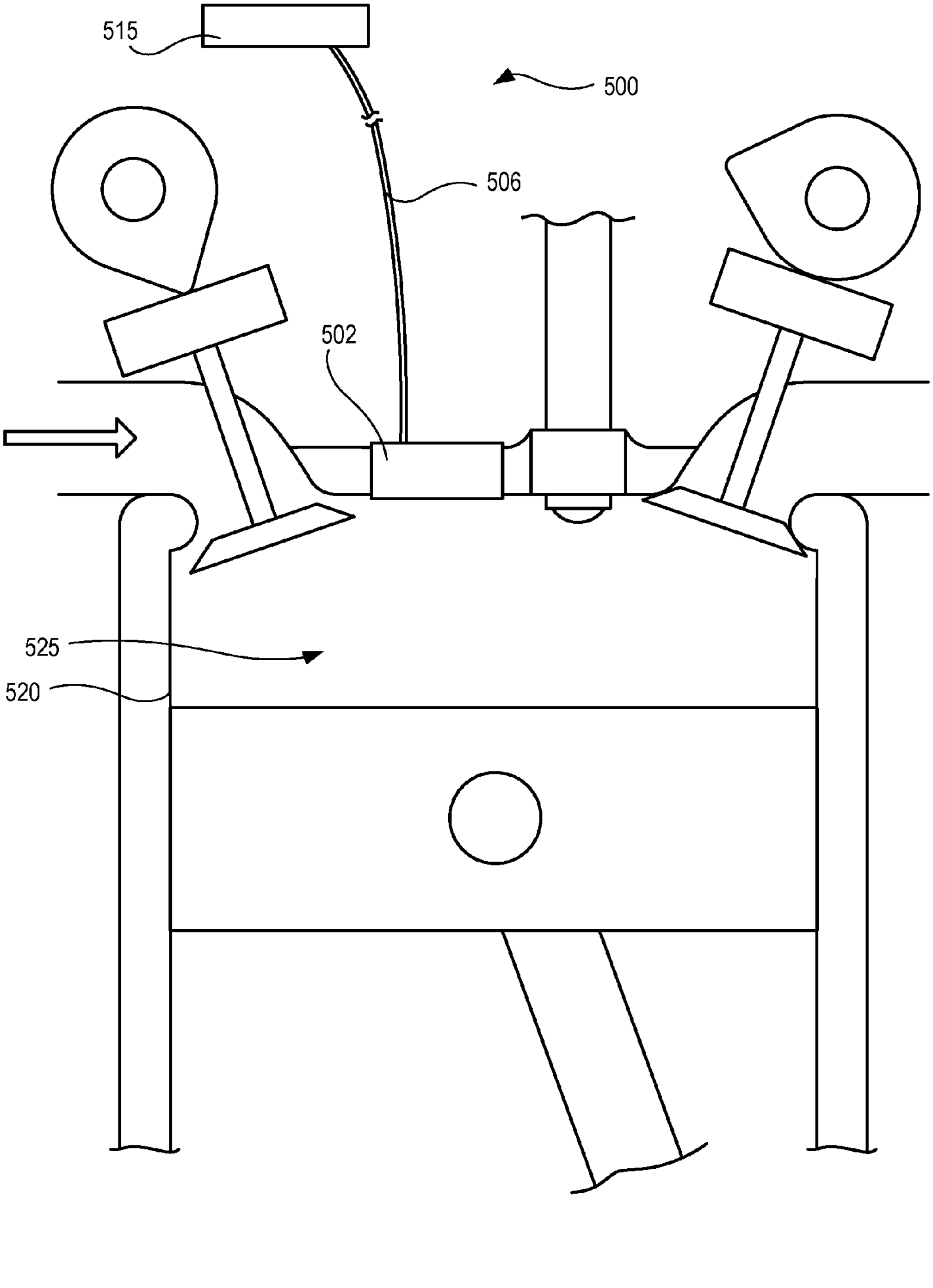
FIG. 7 is a schematic illustration of a portion of an embodiment of a compression-ignition internal combustion engine comprising an embodiment of a heat transfer system.

FIG. 7 is a schematic illustration of a portion of an embodiment of a compression-ignition internal combustion engine, or diesel engine, depicting another embodiment of a heat transfer system 500. As compared to the embodiments described above, the illustrated embodiment does not comprise a spark plug. In the illustrated embodiment, a portion of a combustion chamber 520 defining an interior volume 525 is depicted. As depicted, a compression-ignition internal combustion engine can comprise a combustion chamber 520 and a heat absorption element 502. The illustrated heat absorption element 502 is in communication, or thermal communication, with the interior volume 525 of the combustion chamber 520. In some embodiments, the heat absorption element 502 may be configured to absorb heat from the combustion chamber 520 and/or the interior volume 525 of the combustion chamber 520. Specifically, the heat absorption element 502 may be configured to absorb at least a portion of the heat during at least a portion of a compression stroke. In another example, the heat absorption element 502 may absorb at least a portion of an amount of heat generated by work done on a first combustion fluid disposed in the interior volume 525 of the combustion chamber 520. The first combustion fluid may comprise air, an air-fuel mixture, oxygen, a recycled exhaust gas, an inert gas, and/or any other suitable fluid. For example, a volume of air may be disposed, or introduced, into the interior volume 525 of the combustion chamber 520. The work done on the first combustion fluid may be compression of the first combustion fluid. The compression of the first combustion fluid can generate or produce heat. In certain embodiments, the absorption of heat from the combustion chamber 520 and/or transfer of the absorbed heat to a position outside of the combustion chamber 520 may reduce, or be configured to reduce, the amount of work required or used to compress the first combustion fluid.

Absorption of heat from the combustion chamber 520 at one or more predetermined time periods may further decrease the work required or used to compress the first combustion fluid. In some embodiments, the heat absorption element 502 may be configured to absorb more heat during a first time period in comparison to, or in relation to, during a second time period. The first time period may comprise at least a portion of an intake stroke (i.e., prior to a compression stroke) and/or at least a portion of the compression stroke, and the second time period may comprise at least a portion of a power stroke or, in some embodiments, essentially all of the power stroke. Specifically, the heat absorption element 502 may absorb more heat during at least a portion of the compression stroke than during at least a portion of the power stroke. Other suitable time periods are also contemplated. Stated another way, the heat absorption element 502 may be configured to comprise a greater heat absorption capacity during a first time period in comparison to, or relative to, during a second time period.

In some embodiments, the heat absorption element 502 may be further configured to transfer at least a portion of the absorbed heat to a first cooling fluid. The first cooling fluid may comprise a coolant, an engine coolant, air, a fuel, another suitable fluid, or any combination thereof. The first cooling fluid may flow, or be configured to flow, substantially continuously through the heat absorption element 502. Alternatively, the first cooling fluid may flow, or be configured to flow, substantially intermittently through the heat absorption element 502. For example, at least a portion, or a majority, of the first cooling fluid may egress, or be configured to egress, from the heat absorption element 502 during at least a portion of a power stroke. In certain embodiments, the first cooling fluid may egress from the heat absorption element 502 during another suitable time period.

A thermal conductance from the first combustion fluid to the first cooling fluid via the heat absorption element 502 may be configured to change during a predetermined time period. For example, the thermal conductance from the first combustion fluid to the first cooling fluid via the heat absorption element 502 may decrease during at least a portion of a power stroke. In some embodiments, a heat conduction state of the heat absorption element 502 may be configured to change during a predetermined time period. For example, the heat conduction state of the heat absorption element 502 may be configured to oscillate over time. In further embodiments, the heat absorption element 502 may be configured to transition between a low thermal resistance state and a substantially non-heat-absorbing state. For example, the heat absorption element 502 may be in a low thermal resistance state during at least a portion of a compression stroke, and, alternatively, the heat absorption element 502 may be in a substantially non-heat-absorbing state during at least a portion of a power stroke.

To effect the above-described functional changes of the heat absorption element 502, the heat absorption element 502 may be configured to undergo a physical change. For example, a shape and/or a position of the heat absorption element 502 may be configured to change between at least a portion of the combustion stroke and at least a portion of the power stroke. The shape and/or position of the heat absorption element 502 may also be configured to change during other time periods. In another example, a surface area of the heat absorption element 502 may be configured to change or decrease between at least a portion of the combustion stroke and at least a portion of the power stroke. The surface area of the heat absorption element 502 may also be configured to change during other time periods. In certain embodiments, the heat absorption element 502 may be configured to be at least partially withdrawn from the interior volume 525 of the combustion chamber 520 between at least a portion of the combustion stroke and at least a portion of the power stroke. The heat absorption element 502 may also be configured to be at least partially withdrawn from the interior volume 525 of the combustion chamber 520 during other time periods. Withdrawal, or at least partial withdrawal, of the heat absorption element 502 from the interior volume 525 of the combustion chamber 520 may affect or decrease the amount of heat that the heat absorption element 502 is able to absorb. In some embodiments, the above-described functional changes of the heat absorption element 502 may be effected by a non-mechanical and/or non-physical change of the heat absorption element 502.

With continued reference to FIG. 7, the heat absorption element 502 may be coupled to a heat sink 515 via a thermal transfer element 506. In some embodiments, the heat absorption element 502 may be configured to transfer at least a portion of the absorbed heat to the heat sink 515. In some other embodiments, the heat absorption element 502 may be configured to transfer a majority of the absorbed heat to the heat sink 515. The absorbed heat may be transferred via the first cooling fluid. In some embodiments, as discussed above, the first cooling fluid may be circulated, pumped, or transported by a pump or another suitable device. The heat sink 515 may comprise a second cooling fluid, and the transferred heat may be further transferred from the first cooling fluid to the second cooling fluid. For example, the first cooling fluid and the second cooling fluid may be in communication, or fluid communication, with one another. In other embodiments, the heat sink 515 may comprise a fuel, or the heat sink 515 may comprise both a second cooling fluid and a fuel. At least a first portion of the absorbed heat may be transferred to the second cooling fluid and at least a second portion of the absorbed heat may be transferred to the fuel. For example, there may be an excess of absorbed heat and thus the first portion of the absorbed heat may be discarded or lost, and the second portion of the absorbed heat may be utilized. In other embodiments, the heat sink 515 may be coupled to, or operatively coupled to, a heat exchanger or a radiator. For example, the absorbed heat may be discarded or lost via transfer to the radiator. In contrast, the absorbed heat may be transferred to the heat exchanger and at least a portion of the heat energy may be further utilized. In various embodiments, the heat sink 515 may be thermally coupled to a first cooling fluid via a heat exchanger. In various other embodiments, the heat sink 515 may comprise a radiator.

In embodiments wherein the heat sink 515 comprises fuel, the fuel may be heated. For example, upon transfer of heat from the heat absorption element 502 to the heat sink 515 the fuel can be heated. A fuel injector, or another suitable device, may be configured to introduce at least a portion of the heated fuel into the interior volume 525 of the combustion chamber 520. The fuel injector, or another device, may be further configured to introduce the heated fuel into the interior volume 525 of the combustion chamber 520 at a predetermined time. For example, the fuel injector may inject or introduce the heated fuel into the interior volume 525 of the combustion chamber 520 during at least a portion of a power stroke. Fuel injectors of multiple types, including, but not limited to, single-point, continuous, central port, multiport, or direct injection, may be used in both spark-ignition and compression-ignition internal combustion engines. A fuel injector may also be configured to inject or introduce the heated fuel at various positions in an internal combustion engine, including, but not limited to, a throttle body, an intake port, upstream of a cylinder's intake valve, and/or directly into the combustion chamber.

In some embodiments, the fuel injector, or another device, may be configured to introduce the heated fuel into an interior volume of a precombustion chamber (not shown). Various aspects and components of the embodiments described for coupling to, and/or integration with, the combustion chamber 520 may be adapted for use with a precombustion chamber or for embodiments of engines comprising a precombustion chamber. For example, a plurality of microchannel heat transfer elements, similar to the plurality of microchannel heat transfer elements 503, may be disposed in communication with a precombustion chamber and/or deployed into the precombustion chamber to absorb heat from the precombustion chamber.

Figure 8A:
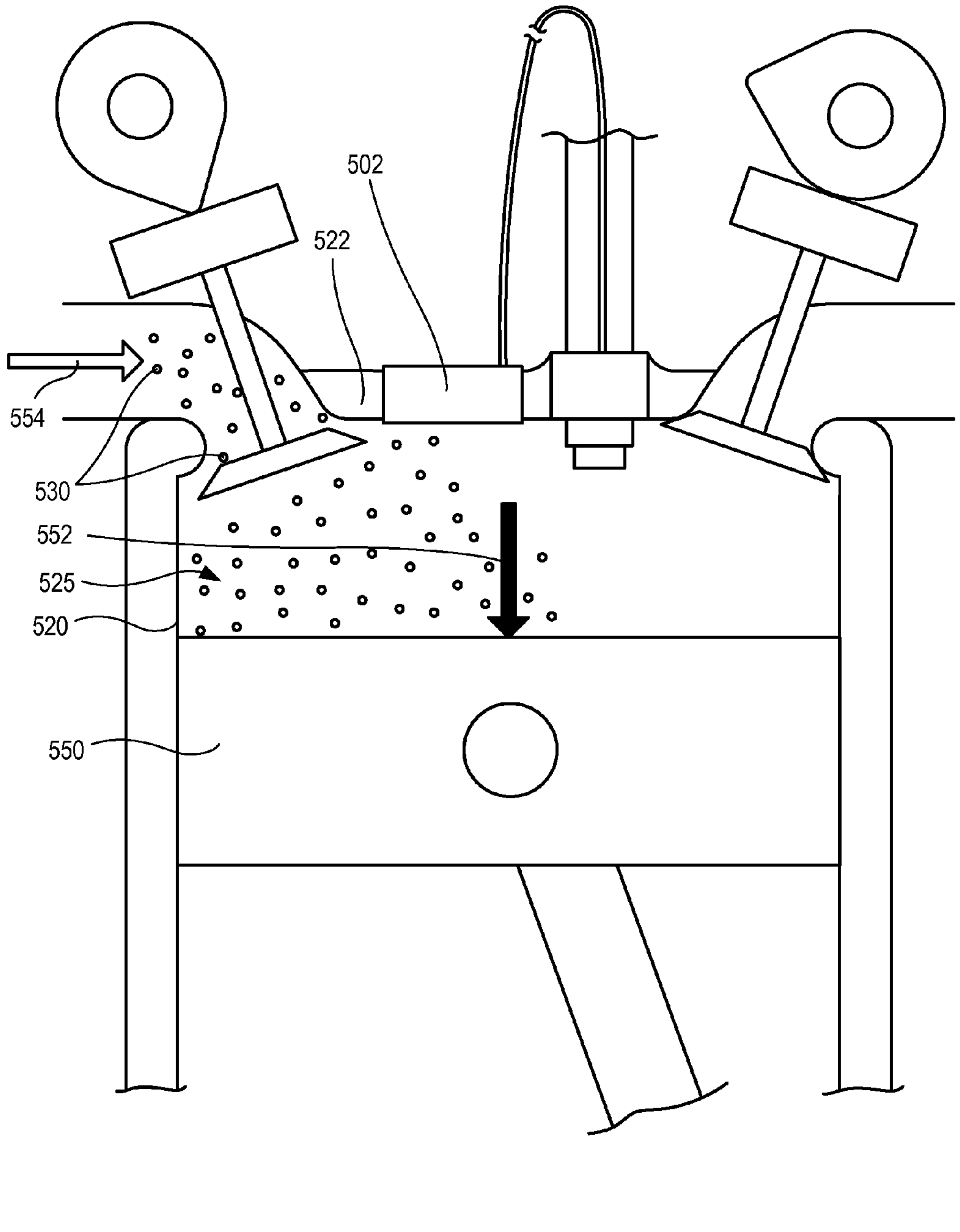
FIG. 8A is a schematic illustration of a portion of a cylinder during an intake stroke of the portion of the embodiment of the engine of FIG. 7.

FIGS. 8A-8D are schematic depictions of various stages during a single thermodynamic cycle of the embodiment of the compression-ignition internal combustion engine, or diesel engine, of FIG. 7. FIG. 8A schematically illustrates a time point during an intake stroke. During the illustrated intake stroke, a piston 550 moves downward, as shown by an arrow 552. The downward movement of the piston 550 may draw or introduce a fresh charge, or a volume, of a first combustion fluid 530 into the interior volume 525 of the combustion chamber 520, as shown by an arrow 554. In some embodiments, the first combustion fluid 530 may comprise air, an air-fuel mixture, oxygen, a recycled exhaust gas, an inert gas, and/or another suitable fluid. As illustrated, the heat absorption element 502 can be disposed in a wall 522 of the combustion chamber 520. As discussed above, other positions of the heat absorption element 502 are also within the scope of this disclosure. In some embodiments, the heat absorption element 502 may comprise a plurality of channels configured for flow or passage of a first cooling fluid. As disclosed elsewhere in the present disclosure, the first cooling fluid may comprise a coolant, an engine coolant, a fuel, air, and/or another suitable fluid. In certain embodiments, the disclosed channels may comprise microchannel heat transfer elements 503, as defined above.

Figure 8B:
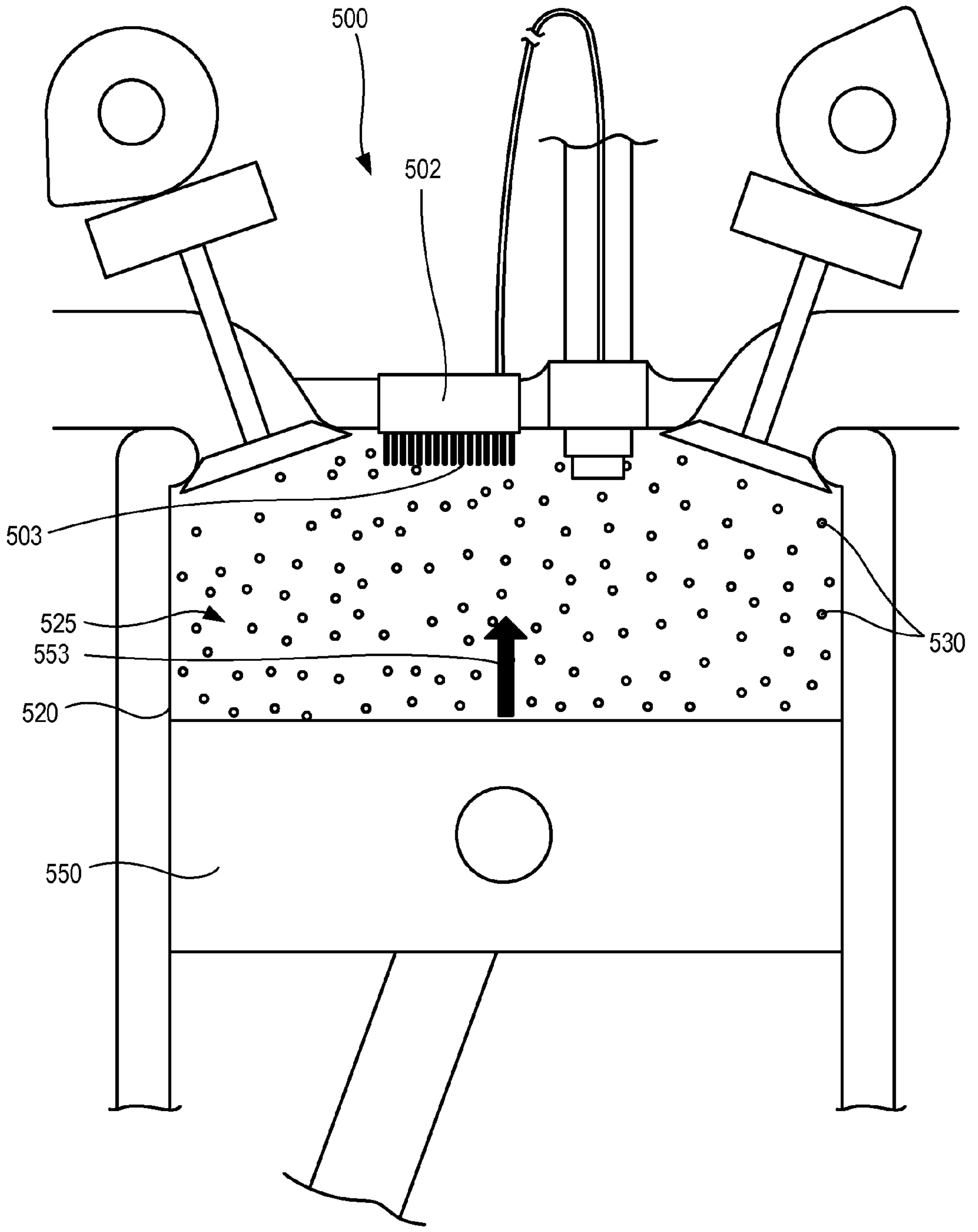
FIG. 8B is a schematic illustration of a portion of a cylinder during a compression stroke of the portion of the embodiment of the engine of FIG. 7.

FIG. 8B is a schematic illustration of a time point during a compression stroke of the embodiment of the engine of FIG. 7. During the compression stroke, the piston 550 moves upward, as shown by the arrow 553. As the piston 550 moves upward the first combustion fluid 530 is compressed generating heat. During at least a portion of the compression stroke the compressed first combustion fluid 530 may comprise sufficient heat to ignite a second combustion fluid. In the illustrated embodiment, the heat absorption element 502 comprises a plurality of microchannel heat transfer elements 503, wherein the plurality of microchannel heat transfer elements 503 forms a plate comprising an array of pins, or a pin grid array. Other configurations of the heat absorption element 502 are also contemplated. For example, as described above, a plurality of individual microchannel heat transfer elements 503 that are only coupled to one another at the heat absorption element 502 may deploy into the interior volume 525 of the combustion chamber 520. In some embodiments, the plurality of microchannel heat transfer elements 503 may form a substantially net- or web-like lattice or structure. The plurality of microchannel heat transfer elements 503 may also comprise an open porous or mesh-like structure (e.g., a mesh-like plate). In some configurations, the plurality of microchannel heat transfer elements 503 may comprise an array of grid-like fins. The plurality of microchannel heat transfer elements 503 may extend or spread out into the interior volume 525 of the combustion chamber 520 from a single entrance point to the interior volume 525 of the combustion chamber 520. Additionally, the plurality of microchannel heat transfer elements 503 may extend into and retract out of the interior volume 525 of the combustion chamber 520 at multiple or various time points. The plurality of microchannel heat transfer elements 503 may also be valve-like or the plurality of microchannel heat transfer elements 503 may fold out from and back against a head or a wall of the combustion chamber 520. In some embodiments, the plurality of microchannel heat transfer elements 503 may be substantially rigid.

In one embodiment, the plurality of microchannel heat transfer elements may comprise at least two substantially parallel channels, wherein the at least two channels are positioned from approximately 1 millimeter to approximately 1 centimeter apart. The at least two channels may be coupled to an array of microchannel heat transfer elements, wherein the at least two channels and the array of microchannel heat transfer elements are configured to deploy into and out of the interior volume of the cylinder. A first of the at least two channels may be configured to carry or transfer a first cooling fluid into the array of microchannel heat transfer elements. Further, a second of the at least two channels may be configured to carry or transfer the first cooling fluid away from the array of microchannel heat transfer elements. The array of microchannel heat transfer elements may provide an area for transferring heat from the fuel charge and from the interior volume of the cylinder.

In various embodiments, the plurality of microchannel heat transfer elements 503 may be configured to transition between a low-profile configuration and a deployed configuration. During the compression stroke, the plurality of microchannel heat transfer elements 503, as illustrated, can deploy into at least a portion of the interior volume 525 of the combustion chamber 520. For example, the plurality of microchannel heat transfer elements 503 may be configured to transition from the low-profile configuration of FIG. 8A to the deployed configuration of FIG. 8B. When in the deployed configuration, the plurality of microchannel heat transfer elements 503 may be configured to transfer more absorbed heat from the combustion chamber 520 than when the plurality of microchannel heat transfer elements 503 is in the low-profile configuration. The plurality of microchannel heat transfer elements 503 and/or the heat transfer system 500 may be configured to transfer heat from the interior volume 525 of the combustion chamber 520 to a heat sink (not shown) via a first cooling fluid. In some embodiments, the plurality of microchannel heat transfer elements 503 may be substantially rigid. In some other embodiments, the plurality of microchannel heat transfer elements 503 may be substantially flexible.

In other embodiments, at least a portion of the heat absorption element 502 may be configured to transition from the low-profile configuration to the deployed configuration for a first time period, and the heat absorption element 502 may be further configured to transition from the deployed configuration to the low-profile configuration for a second time period. The first time period may comprise at least a portion of the intake stroke (i.e., prior to the compression stroke) and/or at least a portion of the compression stroke, and the second time period may comprise a least a portion of a power stroke. In yet other embodiments, the second time period may comprise essentially, or substantially, all of the power stroke. Other suitable time periods are also contemplated.

Figure 8C:
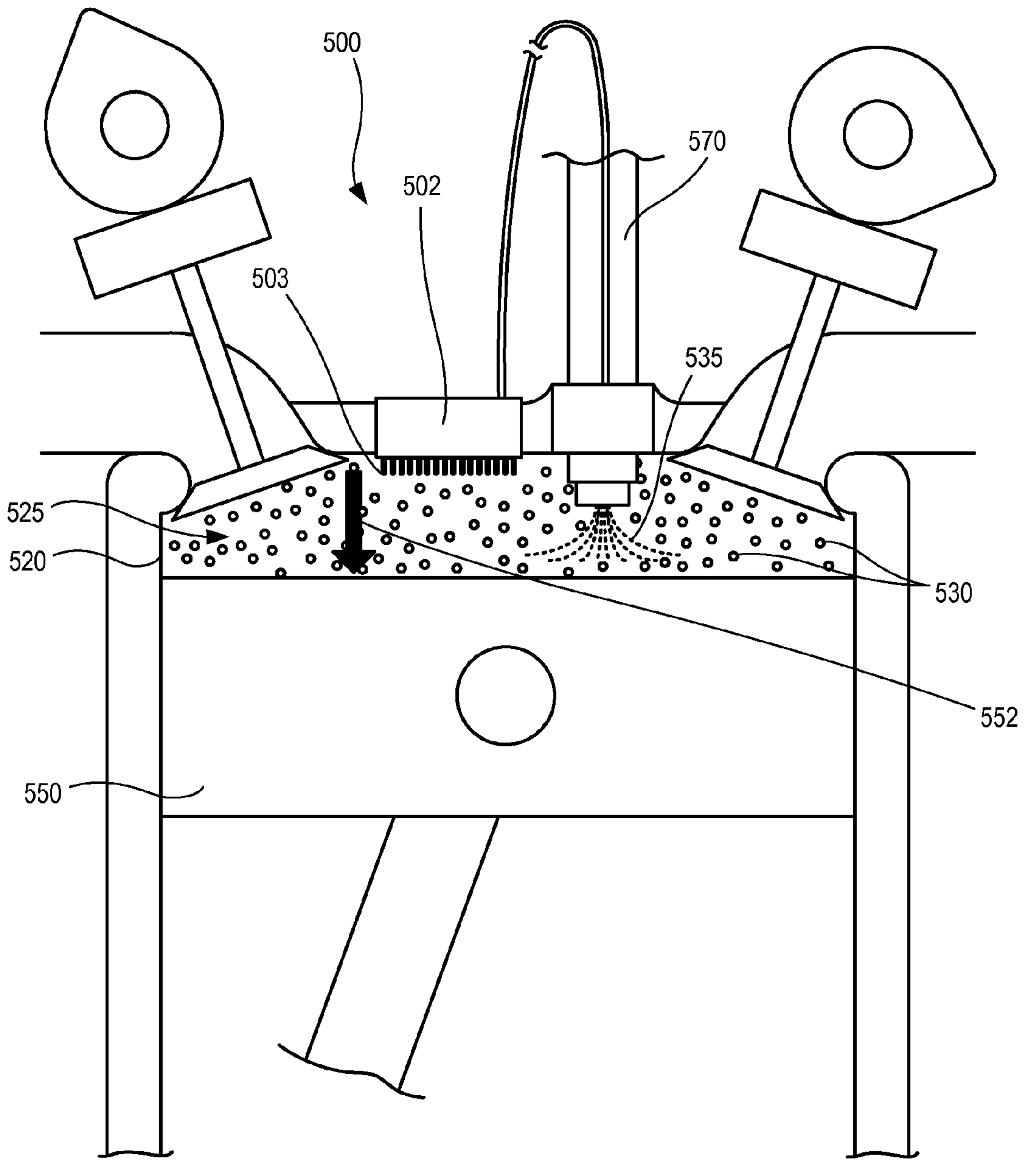
FIG. 8C is a schematic illustration of a portion of a cylinder during a power stroke of the portion of the embodiment of the engine of FIG. 7.

FIG. 8C schematically illustrates a time point during a power stroke of the embodiment of the engine of FIG. 7. As the piston 550 reaches a top portion of the combustion chamber 520, a fuel injector 570 may inject or introduce a second combustion fluid 535 into the interior volume 525 of the combustion chamber 520. The heat generated by the compression of the first combustion fluid 530 may ignite the introduced second combustion fluid 535. The ignition and burning of the second combustion fluid 535 causes the volume of at least the second combustion fluid 535 to expand, which drives or pushes the piston 550 downward, as indicated by the arrow 552. As illustrated, the plurality of microchannel heat transfer elements 503 can transition from the deployed configuration to the low-profile configuration. Stated another way, at least a portion of the heat absorption element 502 may be configured to be at least partially withdrawn from the interior volume 525 of the combustion chamber 520 between at least a portion of the compression stroke and at least a portion of the power stroke. In some embodiments, the piston 550 may be configured such that it does not contact the heat transfer system 500, thus avoiding potential damage to and/or wear on the heat transfer system 500.

In other embodiments, a shape of the heat absorption element, like heat absorption element 502, may be configured to change between at least a portion of the compression stroke and at least a portion of the power stroke. A surface area of the heat absorption element may also be configured to decrease between at least a portion of the compression stroke and at least a portion of the power stroke. In still other embodiments, a position of the heat absorption element may be configured to change between at least a portion of the compression stroke and at least a portion of the power stroke. For example, the position of the heat absorption element may change such that the heat absorption element is no longer in communication with an interior volume of a combustion chamber.

With reference to FIG. 8C, the heat transfer system 500 may be coupled to the fuel injector 570. In some embodiments, the heat transfer system 500 may be configured to absorb heat into a fuel present in at least a portion of the heat transfer system 500. The heat transfer system 500 may be further configured to transfer the heated fuel from the heat absorption element 502 to the fuel injector 570 such that the heated fuel may be injected into the combustion chamber 520 at a predetermined time. Such a configuration may enhance or increase the efficiency of the compression and/or power strokes of the compression-ignition internal combustion engine.

In certain embodiments, the fuel injector 570 may be coupled to both the combustion chamber 520 and the heat absorption element 502. The fuel injector 570 may be configured to introduce or inject at least a portion of the heated fuel from the heat absorption element 502 into the interior volume 525 of the combustion chamber 520 at a predetermined time. Such an embodiment may also be adapted for use in an embodiment of a compression-ignition internal combustion engine comprising a precombustion chamber. In certain other embodiments, the heat absorption element 502 may be coupled to, or in communication with, a heat exchanger (not shown). The heat exchanger may be configured to transfer an amount of heat from a heated first cooling fluid to the first combustion fluid 530, wherein the fuel injector 570 may be configured to introduce or inject the heated first combustion fluid 530 into the interior volume 525 of the combustion chamber 520 at a predetermined time.

Figure 8D:
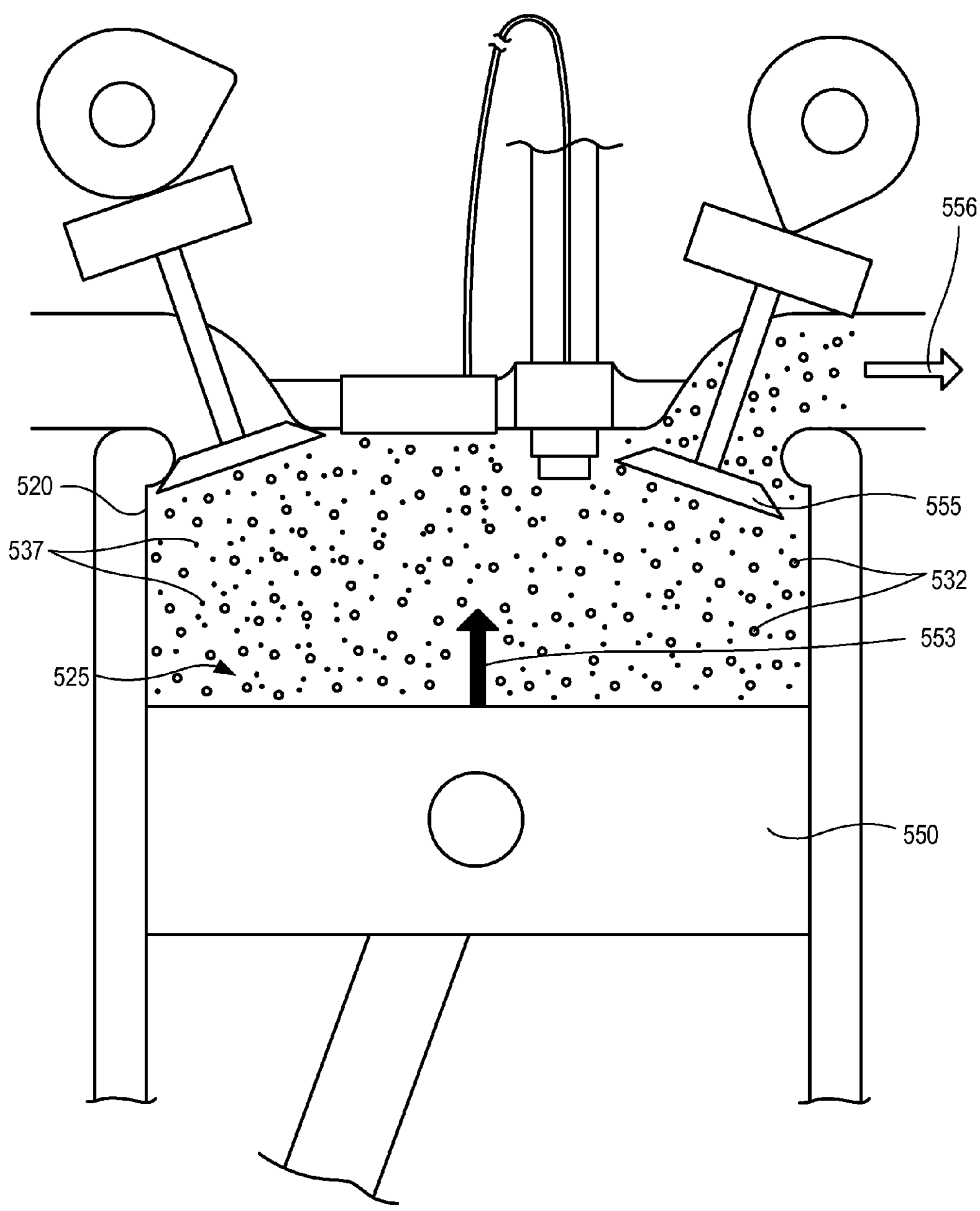
FIG. 8D is a schematic illustration of a portion of a cylinder during an exhaust stroke of the portion of the embodiment of the engine of FIG. 7.

FIG. 8D is a schematic depiction of a time point during an exhaust stroke of the embodiment of the engine of FIG. 7. As illustrated, after the power stroke an exhaust valve 555 may open, and upward movement of the piston 550, as depicted by the arrow 553, can drive or force exhausted first and/or second combustion fluids 532, 537 from the interior volume 525 of the combustion chamber 520, as illustrated by an arrow 556.

Figure 9:
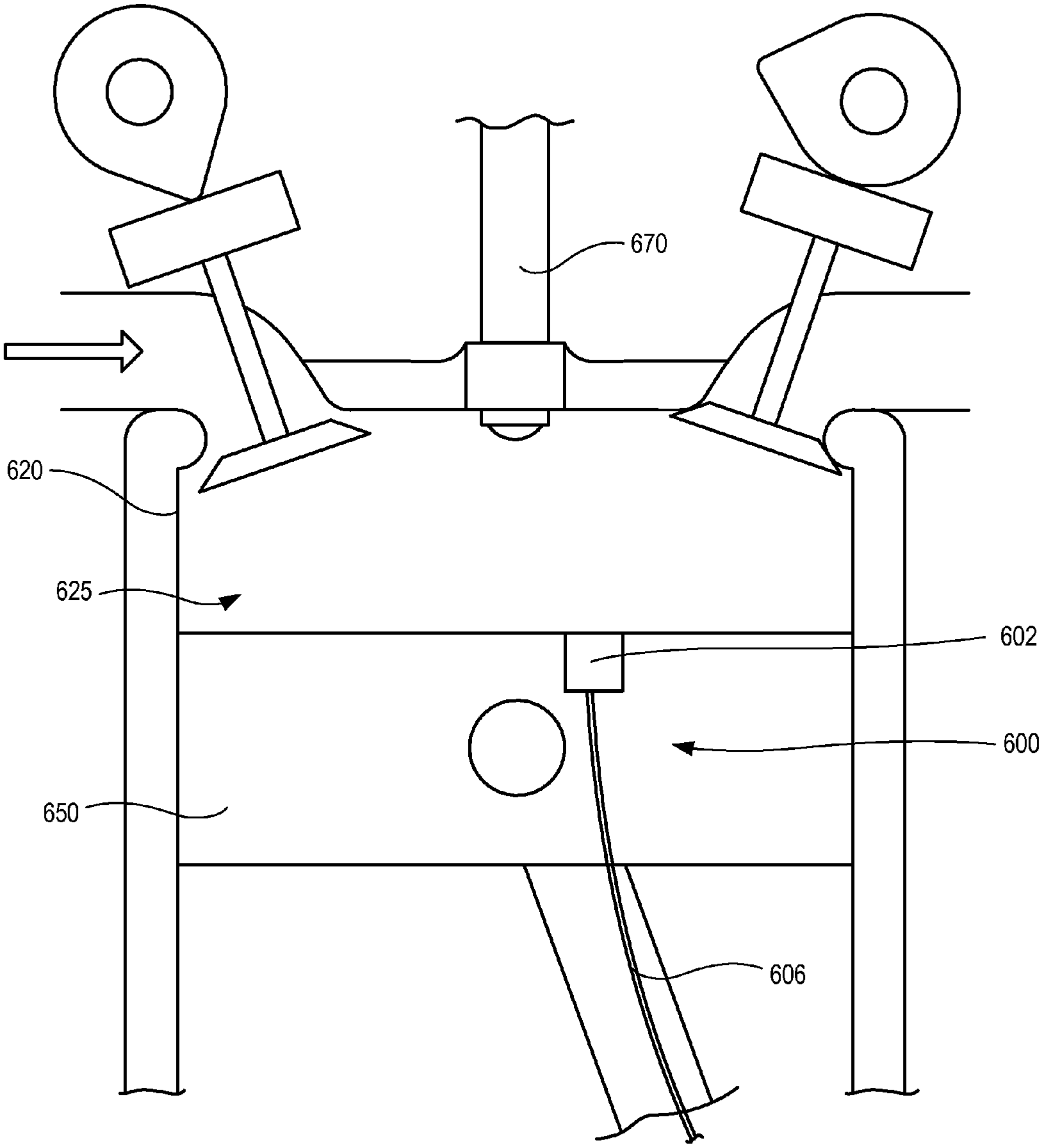
FIG. 9 is a schematic illustration of the portion of the embodiment of the engine of FIG. 7 comprising another embodiment of a heat transfer system.

FIG. 9 is a schematic illustration of a portion of another embodiment of a compression-ignition internal combustion engine depicting another embodiment of a heat transfer system 600. As detailed above, in certain embodiments the heat transfer systems 100, 200, 300, 400, 500 may be configured to be retrofitted into an embodiment of an existing internal combustion engine. With reference to FIG. 9, the heat transfer system 600 may be at least partially disposed within or coupled to a piston 650. As illustrated, the heat absorption element 602 may be at least partially disposed within the piston 650 such that the heat absorption element 602 is in communication, or thermal communication, with an interior volume 625 of a combustion chamber 620. The heat transfer system 600 can also comprise a thermal transfer element 606, wherein the thermal transfer element 606 is in communication with the heat absorption element 602. As described above in connection with other embodiments, the thermal transfer element 606 can be configured to extend at least from a first position at or adjacent the heat absorption element 602 to a second position outside of the combustion chamber 620. Other locations or positions within an embodiment of an existing compression-ignition internal combustion engine may also be suitable for the disposition of another embodiment of a heat transfer system, similar to heat transfer systems 100, 200, 300, 400, 500, 600.

In some embodiments, a heat transfer system, similar to heat transfer systems 500, 600, may be coupled to a glow plug and/or at least a portion of the heat transfer system may be at least partially disposed through a glow plug aperture. Alternatively, the heat transfer system may comprise a glow plug element. The heat absorption element may also be configured to extend from the glow plug aperture into at least a portion of an interior volume of a combustion chamber, or a precombustion chamber, at a predetermined time. For example, the heat absorption element may extend from the glow plug aperture into at least a portion of the interior volume of the combustion chamber, or the precombustion chamber, during at least a portion of the power stroke. The heat transfer system may further comprise a thermal transfer element that extends through at least a portion of the glow plug aperture. In some embodiments, the thermal transfer element may be configured for the passage of the first cooling fluid. For example, the thermal transfer element may comprise a lumen for disposition of the first cooling fluid. The thermal transfer element may be further configured to transfer heat from the interior volume of the combustion chamber to a heat sink.

As detailed above in connection with other embodiments, the heat transfer system 600 may be coupled to the fuel injector 670 and/or at least a portion of the heat transfer system 600 may be at least partially disposed through a fuel injector aperture. Likewise, the heat transfer system 600 may be at least partially disposed through an aperture of a removable and/or replaceable component. A heat transfer system may also be coupled to a fuel injector, and/or at least a portion of the heat transfer system may be at least partially disposed through a fuel injector aperture, a removable component aperture, and/or a replaceable component aperture in a spark-ignition internal combustion engine.

The above-described components and systems may also be utilized or incorporated into engines comprising variable-stroke capabilities or variable-compression-ratio capabilities. Various engines may leverage the cooling of a compressed combustion fluid to attain the combustion fluid-utilization efficiencies of some compression-ignition internal combustion engines or diesel engines.

Methods are also contemplated in connection with the systems and elements disclosed above. Disclosure recited in connection with any system herein may be analogously applied to any method. In other words, any of the processes, steps, cycles, or functions described in connection with the systems above may be analogously incorporated into methods within the scope of this disclosure.

An exemplary method relating to the systems discussed above may comprise a method of improving the performance of an internal combustion engine. The method may comprise absorbing heat from an interior volume of the combustion chamber during at least a portion of a compression stroke. In some embodiments, a greater portion of a total amount of heat may be absorbed from a compressed first combustion fluid than is absorbed from a total amount of heat from an ignited first combustion fluid. Stated another way, more heat may be removed from the combustion chamber when the first combustion fluid is being compressed than when the first combustion fluid is being ignited and burned. The improvement in the performance of the internal combustion engine may comprise reducing compression work. In some embodiments, the method of improving the performance of an internal combustion engine may comprise increasing a charge density in the combustion chamber at the start of the compression stroke. In certain embodiments, the method of improving the performance of an internal combustion engine may comprise increasing a compression ratio of the engine.

In some embodiments, the method may further comprise transferring at least a portion of the heat absorbed from the first combustion fluid and/or the combustion chamber to a position outside of the combustion chamber. As described above, the absorbed heat may be transferred to a heat sink. Alternatively, the heat transferred from the compressed first combustion fluid may be introduced or reintroduced into the interior volume of the combustion chamber during at least a portion of the ignition and/or burning of the first combustion fluid.

Another exemplary method relating to the systems discussed above may comprise increasing a maximum charge density in a combustion chamber of an internal combustion engine. In some embodiments, the method may further comprise maintaining a compression ratio of the engine and increasing an initial charge density in the combustion chamber. In other embodiments, the method may further comprise increasing a compression ratio of the engine and maintaining an initial charge density in the combustion chamber.

Yet another exemplary method relating to the systems discussed above may comprise a method of retrofitting an existing internal combustion engine by disposition of a heat transfer system, as described above, in communication with one or more combustion chambers of the existing internal combustion engine. In a retrofitted internal combustion engine the charge density in the combustion chamber may be increased, as the retrofitted engine may comprise an increased compression ratio and as such may tolerate increased compression.

Figure 10:
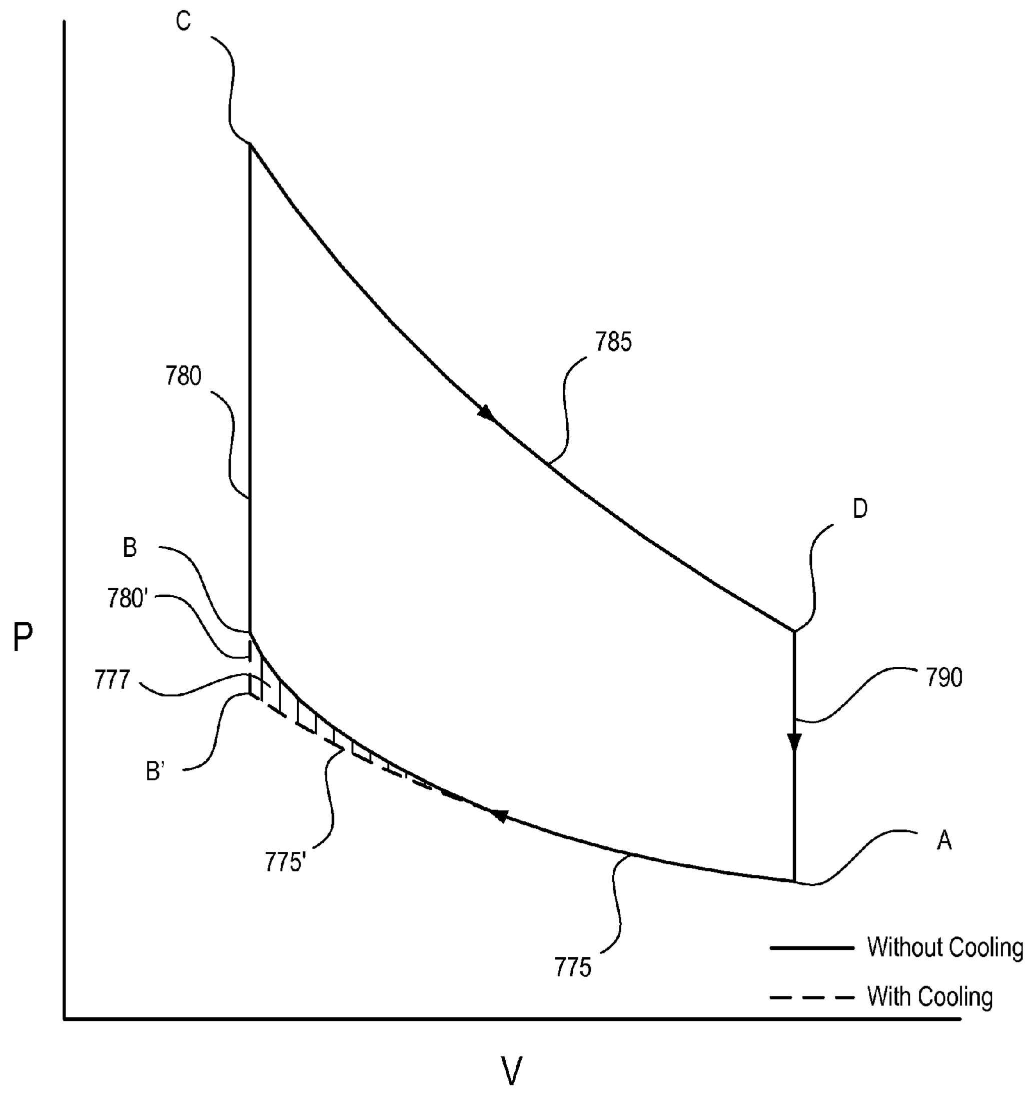
FIG. 10 is a graph depicting a pressure volume diagram of an embodiment of the present disclosure.

FIG. 10 is a pressure volume (PV) diagram illustrating the effects of cooling (i.e., the absorption and/or transfer of heat from an interior volume of a combustion chamber, as described above) in an idealized internal combustion engine. Process 775, or the process shown by the line extending from point A to point B, depicts a compression of contents of the interior volume of the combustion chamber (i.e., via movement of a piston). Process 775', or the process shown by the line extending from point A to point B', depicts the compression of contents in an interior volume of a combustion chamber wherein absorption and/or transfer of heat, as disclosed herein, has occurred. Process 780, or the process shown by the line extending from point B to point C, indicates combustion or ignition of the contents of the interior volume of the combustion chamber and subsequent burning of the contents. Process 780', or the process shown by the line extending from point B' to point C, depicts the compression of contents in the interior volume of the combustion chamber wherein absorption and/or transfer of heat has occurred. Process 785, or the process shown by the line extending from point C to point D, indicates expansion of the contents of the interior volume of the combustion chamber (i.e., the power stroke) and process 790, or the process indicated by the line extending from point D to point A, indicates exhaust. As indicated by the area 777, the cooling may reduce compression work in the engine.

Figure 11:
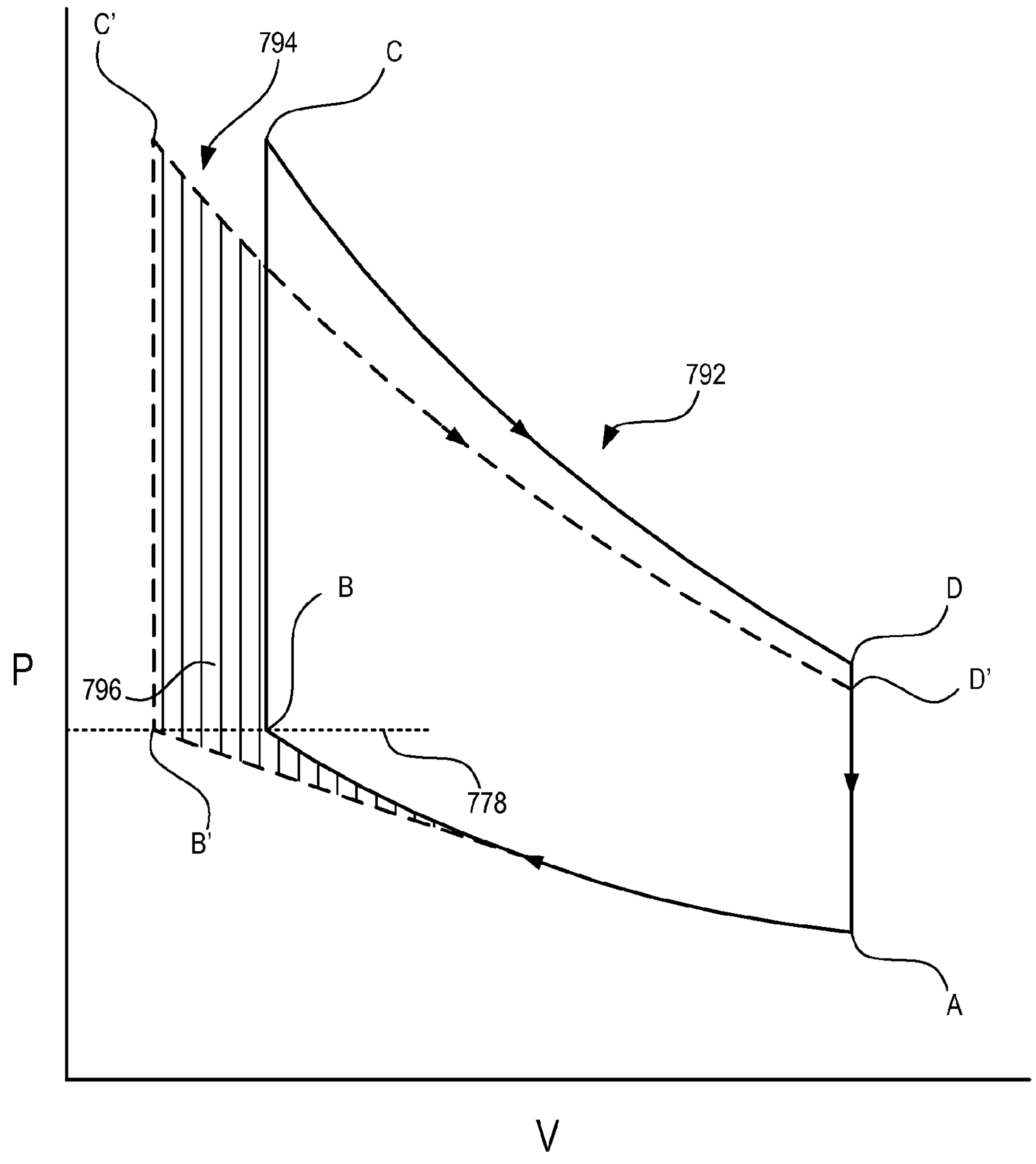
FIG. 11 is a graph depicting a pressure volume diagram of another embodiment of the present disclosure.

FIG. 11 depicts pressure volume curves of a first internal combustion engine 792 and a second internal combustion engine 794. The second engine 794 comprises an increased compression ratio 796 relative to the first engine 792, while a temperature at ignition as indicated by the dotted line 778 is substantially the same in both engines 792, 794. As discussed above, increasing the compression ratio 796 of an internal combustion engine may improve a performance of the engine. Also, an engine with an increased compression ratio 796 may tolerate increased compression. Further, methods of the present disclosure may comprise increasing the compression ratio 796 of the engine while maintaining an initial charge density in the interior volume of the combustion chamber.

Figure 12:
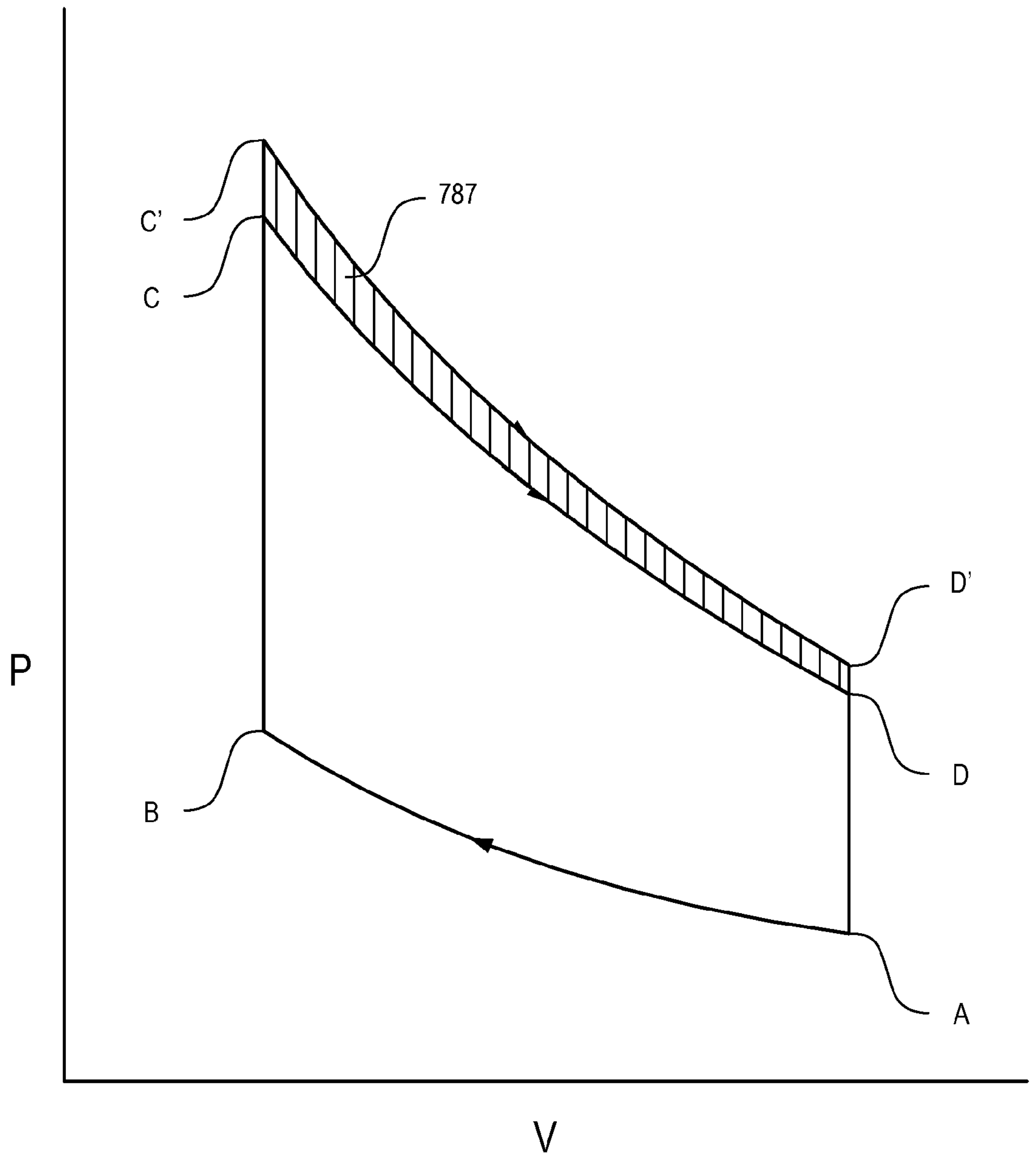
FIG. 12 is a graph depicting a pressure volume diagram of yet another embodiment of the present disclosure.

FIG. 12 depicts another PV diagram illustrating the effects of an increased charge density 787, and increased pressure rise, in an internal combustion engine. Improving the performance of an internal combustion engine may comprise increasing a charge density in the interior volume of the combustion chamber at or near the start of the compression at point A. In contrast to FIG. 11, methods of the present disclosure may alternatively comprise maintaining a compression ratio of the engine and increasing an initial charge density in the interior volume of the combustion chamber.

Without further elaboration, it is believed that one skilled in the art can use the preceding description to utilize the present disclosure to its fullest extent. The examples and embodiments disclosed herein are to be construed as merely illustrative and exemplary and not as a limitation of the scope of the present disclosure in any way. It will be apparent to those having skill in the art, having the benefit of this disclosure, that changes may be made to the details of the above-described embodiments without departing from the underlying principles of the disclosure herein.

The invention claimed is:

1. A spark-ignition internal combustion engine comprising:

a combustion chamber; and a heat absorption element in communication with an interior volume of the combustion chamber, wherein the heat absorption element is configured to transition from a low-profile configuration to a deployed configuration for a first time period, wherein the heat absorption element is further configured to transition from the deployed configuration to the low-profile configuration for a second time period, and wherein the heat absorption element is configured to absorb at least a portion of an amount of heat generated by work done on a first combustion fluid disposed in the interior volume of the combustion chamber.

2. The engine of claim 1, wherein the heat absorption element is further configured to transfer at least a portion of the absorbed heat to a first cooling fluid.

3. The engine of claim 2, wherein the first cooling fluid comprises a fuel, and wherein at least a portion of the heated fuel is introduced into the interior volume of the combustion chamber during at least a portion of a power stroke.

4. The engine of claim 1, wherein the heat absorption element is further configured to transfer at least a portion of the absorbed heat to a heat sink.

5. The engine of claim 4, wherein at least a portion of the absorbed heat is transferred to the heat sink via a first cooling fluid.

6. The engine of claim 4, wherein the heat sink comprises a fuel.

7. The engine of claim 5, wherein the heat absorption element comprises a plurality of channels configured for passage of the first cooling fluid.

8. The engine of claim 7, wherein the channels are microchannel heat transfer elements.

9. The engine of claim 2, wherein thermal conductance from the first combustion fluid to the first cooling fluid via the heat absorption element is configured to decrease during at least a portion of a power stroke.

10. A heat transfer system configured to be retrofitted into a spark-ignition internal combustion engine, the heat transfer system comprising:

a heat absorption element configured to be disposed within and absorb heat from an interior volume of a combustion chamber; and a thermal transfer element in communication with the heat absorption element, the thermal transfer element configured to extend at least from a first position at or adjacent the heat absorption element to a second position outside of the combustion chamber, wherein the thermal transfer element comprises a fluid flow path configured to transfer heat from the heat absorption element to a heat sink, wherein a first cooling fluid flows intermittently through the fluid flow path between at least the heat absorption element and the heat sink, and wherein at least a portion of the first cooling fluid egresses from the heat absorption element during a power stroke.

11. The heat transfer system of claim 10, wherein the first cooling fluid is transferred between the heat absorption element and the heat sink by a pump.

12. The heat transfer system of claim 10, wherein the heat sink comprises a second cooling fluid.

13. The heat transfer system of claim 12, wherein the first cooling fluid is in thermal communication with the second cooling fluid.

14. The heat transfer system of claim 10, wherein the heat absorption element comprises a plurality of channels for passage of a first cooling fluid.

15. The heat transfer system of claim 14, wherein the channels are microchannel heat transfer elements.

16. The heat transfer system of claim 15, wherein the plurality of microchannel heat transfer elements is configured to deploy into at least a portion of the interior volume of the combustion chamber.

17. The heat transfer system of claim 10, wherein the heat absorption element is configured to absorb more heat during a first time period in comparison to a second time period.

18. The heat transfer system of claim 10, wherein the interior volume of the combustion chamber comprises a predetermined compression ratio, wherein the heat absorption element is configured to occupy a portion of the interior volume of the combustion chamber, and wherein the volume occupied by the heat absorption element alters the predetermined compression ratio.

19. The heat transfer system of claim 10, wherein the heat absorption element is configured for disposition through an existing aperture of the combustion chamber.

20. The heat transfer system of claim 10, wherein the heat absorption element comprises a spark plug element.

21. A spark-ignition internal combustion engine system comprising:

one or more variable-volume combustion chambers; and a heat transfer system comprising one or more heat absorption elements, wherein each heat absorption element is in communication with an interior volume of at least one of the combustion chambers, wherein the one or more heat absorption elements are configured to absorb heat from the interior volume of the one or more combustion chambers, wherein the one or more heat absorption elements comprise a plurality of microchannels configured for passage of a first cooling fluid, and wherein the microchannels are channels having laminar flow at operating conditions and a height-to-width ratio of about 1 or greater.

22. The engine system of claim 21, wherein the interior volume of the one or more combustion chambers is configured to receive a volume of a first combustion fluid during at least a portion of an intake stroke, wherein the one or more combustion chambers are configured to compress the volume of the first combustion fluid during at least a portion of a compression stroke, wherein the heat transfer system is configured to absorb at least a portion of the heat from the first combustion fluid during at least a portion of the compression stroke, and wherein the heat transfer system is configured to transfer at least a portion of the absorbed heat from the first combustion fluid to a heat sink.

23. The engine system of claim 21, wherein the heat transfer system is configured to transfer a portion of heat generated by work done on a volume of a first combustion fluid disposed in the interior volume of the one or more combustion chambers to a heat sink.

24. The engine system of claim 21, wherein a volume of a first combustion fluid is disposed in the interior volume of the one or more combustion chambers, and wherein the one or more heat absorption elements are configured to transfer a portion of a total amount of heat from the first combustion fluid to a first cooling fluid during a compression stroke.

25. The engine system of claim 22, wherein the heat transfer system is configured to transfer a greater portion of the total amount of heat from the one or more combustion chambers during at least a portion of the compression stroke as compared to during at least a portion of a power stroke.

26. The engine system of claim 21, wherein the one or more heat absorption elements are configured to transition from a low-profile configuration to a deployed configuration for a first time period, and wherein the one or more heat absorption elements are further configured to transition from the deployed configuration to the low-profile configuration for a second time period.

27. A method of increasing a maximum charge density in a combustion chamber of an internal combustion engine, comprising:

disposing a heat absorption element in communication within an interior volume of a combustion chamber;

introducing a volume of a first combustion fluid into the interior volume of the combustion chamber;

compressing the volume of the first combustion fluid;

absorbing at least a portion of a total amount of heat generated by the compression of the first combustion fluid into the heat absorption element;

igniting the first combustion fluid, wherein the heat absorption element is configured to comprise a greater heat absorption capacity during the compression of the first combustion fluid than during the ignition of the first combustion fluid; and introducing at least a portion of the absorbed heat into the interior volume of the combustion chamber via a fuel injector during the ignition of the first combustion fluid.

28. The method of claim 27, further comprising:

absorbing into the heat absorption element a portion of a total amount of heat generated by work done on the first combustion fluid.

* * * * *